(12) United States Patent
Kanamitsu et al.

(10) Patent No.: US 10,142,503 B2
(45) Date of Patent: Nov. 27, 2018

(54) IMAGE READING APPARATUS

(71) Applicant: SEIKO EPSON CORPORATION, Tokyo (JP)

(72) Inventors: Masatomo Kanamitsu, Fukuoka (JP); Kenichi Murahashi, Fukuoka (JP); Wataru Beppu, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/628,041

(22) Filed: Jun. 20, 2017

(65) Prior Publication Data
US 2017/0374214 A1 Dec. 28, 2017

(30) Foreign Application Priority Data

Jun. 28, 2016 (JP) ................. 2016-127606
Jun. 28, 2016 (JP) ................. 2016-127607
Jun. 28, 2016 (JP) ................. 2016-127608

(51) Int. Cl.
*H04N 1/04* (2006.01)
*H04N 1/00* (2006.01)
(Continued)

(52) U.S. Cl.
CPC ......... *H04N 1/00602* (2013.01); *B65H 5/062* (2013.01); *B65H 7/14* (2013.01);
(Continued)

(58) Field of Classification Search
CPC .. H04N 1/00602; H04N 1/193; H04N 1/0057; H04N 1/1215; H04N 1/00588; H04N 1/00681; H04N 1/00612; H04N 1/00745; H04N 1/00567; H04N 2201/0081; H04N 1/00591; H04N 1/00734; H04N 1/12; H04N 1/00572; H04N 1/00578; H04N 1/00615; H04N 1/0062; H04N 1/00631; H04N 1/00713; H04N 1/0405; H04N 1/1017; H04N 1/125; H04N 1/3876; H04N 2201/0456; H04N 1/00596; H04N 1/00623; H04N 1/00628; H04N 1/00779; H04N 1/00795; H04N 1/00538; H04N 1/00541; H04N 1/0058; H04N 1/00649;
(Continued)

(56) References Cited

U.S. PATENT DOCUMENTS 5,315,397 A * 5/1994 Inoue ................. H04N 1/32379
 347/3
5,805,309 A * 9/1998 Hwang ................. H04N 1/0057
 347/129
(Continued)

FOREIGN PATENT DOCUMENTS

JP 2005-260387 A 9/2005
JP 2015-195442 A 11/2015

*Primary Examiner* — Negussie Worku

(57) ABSTRACT

A feed detection unit which detects a document which is fed is provided at a position between a pinching position at which a feed roller and a frictional force application portion pinch the document and an intersecting position at which a tangential line of the feed roller which is closer to a downstream side in a transport direction than the pinching position is perpendicular to a transport path in the transport direction, which is a different position from the feed roller in a width direction which intersects the transport direction.

17 Claims, 17 Drawing Sheets

(51) Int. Cl.
*B65H 5/06* (2006.01)
*B65H 7/14* (2006.01)

(52) U.S. Cl.
CPC ..... *H04N 1/00588* (2013.01); *H04N 1/00702* (2013.01); *H04N 1/04* (2013.01)

(58) Field of Classification Search
CPC ........... H04N 1/00702; H04N 1/00705; H04N 1/00748; H04N 1/00753; H04N 1/00793; H04N 1/0313; H04N 1/04; H04N 1/121; H04N 1/1916; H04N 1/195; H04N 1/2032; H04N 1/32609; H04N 1/3263; H04N 1/32673; H04N 2201/0448; H04N 1/00525; H04N 1/00554; H04N 1/00689; H04N 1/00708; H04N 1/00718; H04N 1/00732; H04N 1/00755; H04N 1/00771; H04N 1/00782; H04N 1/031; H04N 1/0461; H04N 1/1903; H04N 1/1933; H04N 1/207; H04N 1/32496; H04N 1/32561; H04N 1/393; H04N 2201/0082; H04N 2201/0416; H04N 2201/044; H04N 2201/33328; B65H 2220/01; B65H 2511/414; B65H 2511/51; B65H 2220/03; B65H 2511/20; B65H 2515/34; B65H 5/06; B65H 5/062; B65H 2220/04; B65H 2220/08; B65H 2220/11; B65H 2404/1521; B65H 3/5223; B65H 5/38; B65H 9/106; B65H 2511/524; B65H 2513/51; B65H 2601/11; B65H 2601/26; B65H 3/0661; B65H 2220/02; B65H 2301/31124; B65H 2301/42328; B65H 2403/42; B65H 2403/72; B65H 2404/144; B65H 3/44; B65H 3/46; B65H 7/125; B65H 7/14; B65H 2403/512; B65H 2404/143; B65H 2404/1441; B65H 5/26

USPC ....... 358/498, 474, 496, 497, 488, 296, 494, 358/514, 1.1, 1.14, 400, 408, 450, 483, 358/486, 500, 503; 399/262, 367, 111, 399/369, 124, 16, 17, 297, 365, 368, 370, 399/371, 372, 373, 374, 375, 393, 394, 399/45, 70; 271/274, 10.02, 186, 225, 271/242, 258.01, 265.01, 3.01, 4.02, 271/10.01, 10.12, 10.13, 114, 121, 171, 271/223, 262, 264, 273, 291, 298, 301, 271/314, 3.05, 3.15, 4.1, 69, 902, 9.01, 271/9.05, 9.06

See application file for complete search history.

(56) References Cited

U.S. PATENT DOCUMENTS

| | | | |
|---|---|---|---|
| 5,996,995 A * | 12/1999 | Kim | B65H 29/60 |
| | | | 271/184 |
| 6,161,831 A | 12/2000 | Kusakabe et al. | |
| 2004/0140606 A1 | 7/2004 | Kobayashi et al. | |
| 2005/0062794 A1 * | 3/2005 | Kanannitsu | B41J 2/16523 |
| | | | 347/31 |
| 2007/0127087 A1 | 6/2007 | Nabemoto et al. | |
| 2009/0219495 A1 * | 9/2009 | Wang | G03B 27/52 |
| | | | 355/24 |
| 2013/0168919 A1 * | 7/2013 | Murata | G03G 15/607 |
| | | | 271/111 |
| 2015/0281488 A1 | 10/2015 | Kawauchi | |
| 2017/0050812 A1 * | 2/2017 | Mukai | B65H 3/46 |
| 2017/0107068 A1 * | 4/2017 | Kanamitsu | H04N 1/00628 |
| 2017/0344819 A1 * | 11/2017 | Murahashi | G06K 7/10 |
| 2017/0351209 A1 * | 12/2017 | Nagano | B65H 5/26 |
| 2017/0374216 A1 * | 12/2017 | Kanamitsu | B65H 29/125 |

* cited by examiner

IMAGE READING APPARATUS

BACKGROUND

1. Technical Field

The present invention relates to an image reading apparatus such as a scanner which reads an image of a document.

2. Related Art

In the related art, there is known an image reading apparatus which is provided with a pickup roller (a feed roller) which feeds a document which is placed on a document tray (a placement portion) to a transport path, and a reading unit which reads an image of the document which is fed (JP-A-2015-195442).

In this image reading apparatus, a document detection sensor is provided in the vicinity of the reading unit, and the reading unit is caused to start the reading using the fact that the document detection sensor detects a leading end of a document as a trigger. In the image reading apparatus, the next document is fed using the fact that a rear end of the document is detected by the document detection sensor as a trigger.

In the related art, there is known an image reading apparatus which is provided with a feed roller (a transport roller) which transports a document from the upstream side to the downstream side in the transport direction, and a line sensor (a reading unit) which reads an image of the document which is transported (for example, JP-A-2005-260387).

The image reading apparatus is provided with a pickup roller (a feed roller) which feeds the document which is placed on a paper placement stand (a placement portion) to a transport path, and a separation pad (a frictional force application portion) which separates the documents which are fed by the pickup roller into a single sheet at a time.

Incidentally, since the document detection sensor is provided in the vicinity of the reading unit, for example, in a case in which the next document is fed using the fact that the document detection sensor detects the rear end of the document as a trigger, an interval between the documents is widened and the throughput is decreased.

SUMMARY

An advantage of some aspects of the invention is to provide an image reading apparatus which is capable of improving the throughput.

Binding holes which are referred to as punch holes for binding documents together may be formed in the document. Therefore, in the image reading apparatus, there is a case in which a binding hole is erroneously detected as the rear end of the document, the next document is fed, and the documents are fed in an overlapped state (multi-feed).

Another advantage of some aspects of the invention is to provide an image reading apparatus which is capable of reducing the risk of documents being fed in an overlapped state.

The separation pad separates the document by generating a frictional force which acts in an opposite direction from the transport direction between the document and the separation pad by pushing the document which is fed against the pickup roller.

Therefore, while the document is positioned in a pinching position at which the document is pinched between the pickup roller and the separation pad, a frictional force acts on the document, whereas when the document passes the pinching position, the frictional force of the separation pad no longer acts on the document. Therefore, after the document passes the pinching position, the speed at which the document passes the line sensor increases, and the length of the image which is read by the line sensor is shortened.

Still another advantage of some aspects of the invention is to provide an image reading apparatus which is capable of reducing changes to the length of the image which is read by the reading unit.

Hereinafter, means of the invention and operation effects thereof will be described.

According to an aspect of the invention, there is provided an image reading apparatus which includes a feed unit which includes a feed roller which feeds a document from a placement portion on which the document is placed toward a transport path, and a frictional force application portion which applies a frictional force to an opposite side from a transport direction between the frictional force application portion and the document which is fed by the feed roller, a feed detection unit which detects the document which is fed by the feed unit, and a reading unit which reads an image of the document which is transported along the transport path from an upstream side toward a downstream side in the transport direction, in which the feed detection unit is provided at a position between a pinching position at which the feed roller and the frictional force application portion pinch the document and an intersecting position at which a tangential line of the feed roller which is closer to the downstream side in the transport direction than the pinching position is perpendicular to the transport path in the transport direction, which is a different position from the feed roller in a width direction which intersects the transport direction.

According to this configuration, since the feed detection unit is provided to overlap the feed roller in the transport direction, in comparison with a case in which the feed detection unit is provided closer to the downstream side in the transport direction than the feed roller, it is possible to swiftly detect the document which is fed. Therefore, the interval from when the feeding of the previous document is completed until when the next document is fed is shortened by feeding the document based on the detection results of the feed detection unit, for example, and it is possible to improve throughput.

The image reading apparatus may further include a transport roller which transports the document along the transport direction, in which the feed detection unit may be provided at a position closer to the upstream side in the transport direction than the transport roller.

According to this configuration, since the feed detection unit is provided at a position which is closer to the upstream side in the transport direction than the transport roller, in comparison to a case in which the feed detection unit is provided at a position which is closer to the downstream side in the transport direction than the transport roller, it is possible to narrow the interval between the documents in the transport direction.

The image reading apparatus may further include a multi-feed detection unit which detects multi-feed of the document, in which the feed detection unit may be provided at a position closer to the upstream side in the transport direction than the multi-feed detection unit.

According to this configuration, since the feed detection unit is provided closer to the upstream side in the transport direction than the multi-feed detection unit, in comparison to a case in which the feed detection unit is provided at a position which is closer to the downstream side in the transport direction than the multi-feed detection unit, it is possible to narrow the interval between the documents in the transport direction.

In the image reading apparatus, the multi-feed detection unit may be provided on one side and the feed detection unit is provided on the other side in the width direction to interpose a center of the transport path.

According to this configuration, the feed detection unit is provided on the opposite side from the multi-feed detection unit to interpose the center of the transport path. In other words, since the feed detection unit is provided at a position which is distanced from the multi-feed detection unit in the width direction, it becomes easier to secure the space for providing the feed detection unit.

The image reading apparatus may further include a housing portion which houses the feed roller, in which the feed detection unit may be provided in a different position from the housing portion.

According to this configuration, in a case in which the housing portion is exposed to the outside such as in a case in which the feed roller is exchanged, for example, it is possible to reduce the risk of the feed detection unit being exposed to the outside.

In the image reading apparatus, a drive force transmission unit which transmits a drive force of a drive source to the feed roller may be provided on one side and the feed detection unit is provided on the other side in the width direction to interpose a center of the transport path.

According to this configuration, the feed detection unit is provided on the opposite side from the drive force transmission unit to interpose the center of the transport path. In other words, since the feed detection unit is provided at a position which is distanced from the drive force transmission unit in the width direction, it becomes easier to secure the space for providing the feed detection unit.

In the image reading apparatus, the feed detection unit may be provided at a position which is greater than or equal to 35 mm and less than or equal to 40 mm from a center of the transport path in the width direction.

There is a case in which the holes for passing rings through are formed along the long side in the document of the so-called Bible size. According to this configuration, since the feed detection unit is provided at a position which the holes which are formed in the document of the Bible size pass, it is possible to detect the holes which are formed in the document using the feed detection unit.

According to another aspect of the invention, there is provided an image reading apparatus which includes a feed unit which feeds a document from a placement portion on which the document is placed toward a transport path, a feed detection unit which detects the document which is fed by the feed unit, a transport detection unit which detects the document which is transported along the transport path from an upstream side toward a downstream side in a transport direction, a reading unit which reads an image of the document which is transported, and a control unit which controls driving of the feed unit, in which the feed detection unit and the transport detection unit output a detection signal in which the document is detected and a non-detection signal in which the document is not detected, and in which in a case in which a discharge number which is a number of times the feed detection unit outputs the non-detection signal is less than or equal to one time in a duration from when the feed detection unit outputs the detection signal until when the transport detection unit outputs the detection signal, the control unit drives the feed unit when the feed detection unit outputs the non-detection signal after the transport detection unit outputs the detection signal, and in a case in which the discharge number is greater than or equal to two times, the control unit drives the feed unit when the transport detection unit outputs the non-detection signal.

The plurality of holes are formed in the document to form a row as in refills of a loose leaf file or a notebook, for example. When the holes pass the feed detection unit, the non-detection signal in which the document is not detected is output from a feed detection unit. Therefore, in a case in which the feeding is performed with the row of holes aligned to the transport direction, for example, there is a possibility that the feed detection unit will output the non-detection signal two or more times. In a case in which the row of holes is caused to be perpendicular to the transport direction and the document is fed, the non-detection signal which is output by the feed detection unit is output one or less times. According to this configuration, the control unit controls the driving of the feed unit based on the discharge number of the non-detection signal. In other words, in a case in which the feed detection unit outputs the non-detection signal a plurality of times, and there is a great risk that the holes which are formed in the document will be erroneously detected as the rear end of the document, the control unit drives the feed unit when the transport detection unit outputs the non-detection signal. Therefore, it is possible to reduce the risk of the document being fed in an overlapped state.

In the image reading apparatus, the feed detection unit may be provided in a different position from a center of the transport path in a width direction which intersects the transport direction.

The holes in the document are often formed on the edge of the document. According to this configuration, since the feed detection unit is provided in a different position from the center in the width direction, in comparison to a case in which the feed detection unit is provided in the center in the width direction, it is possible to increase the probability of the feed detection unit detecting the holes of the document.

In the image reading apparatus, the feed detection unit may include a light emitting unit which emits light and a light receiving unit which receives the light which is emitted from the light emitting unit, and the transport detection unit may include a contact portion which comes into contact with the document.

According to this configuration, the feed detection unit which includes the light emitting unit and the light receiving unit, and the transport detection unit which includes the contact portion each detects the document using a different system. Therefore, the detection units of both the feed detection unit and the transport detection unit are capable of reducing the risk of the holes which are formed in the document being erroneously detected as the rear end of the document.

In the image reading apparatus, the feed detection unit and the transport detection unit may be provided in different positions in a width direction which intersects the transport direction.

According to this configuration, the feed detection unit and the transport detection unit are provided in different positions in the width direction. Therefore, in a case in which the row of holes is caused to match the transport direction and the document is fed, and the feed detection unit detects the plurality of holes, the transport detection unit does not detect the holes. Therefore, by feeding the next document based on the detection results of the transport detection unit, it is possible to reduce the risk of the document being fed in an overlapped state.

In the image reading apparatus, the feed detection unit may be provided at a position which is greater than or equal to 35 mm and less than or equal to 40 mm from a center of the transport path in a width direction which intersects the transport direction.

There is a case in which the holes for passing rings through are formed along the long side in the document of the so-called Bible size. According to this configuration, since the feed detection unit is provided at a position which the holes which are formed in the document of the Bible size pass, it is possible to detect the holes which are formed in the document using the feed detection unit.

According to still another aspect of the invention, there is provided an image reading apparatus which includes a feed unit which includes a feed roller which feeds a document from a placement portion on which the document is placed toward a transport path, and a frictional force application portion which applies a frictional force to an opposite side from a feed direction between the frictional force application portion and the document which is fed by the feed roller, a feed detection unit which is provided closer to a downstream side in the feed direction than the frictional force application portion and which detects the document which is fed by the feed unit, a transport roller which transports the document which is fed by the feed unit from an upstream side to a downstream side in a transport direction, a reading unit which reads an image of the document which is transported by the transport roller, and a control unit which controls driving of the transport roller, in which the control unit decelerates a transport speed at which the transport roller transports the document when the feed detection unit detects a rear end of the document.

According to this configuration, since the control unit decelerates the transport speed when the feed detection unit detects the rear end of the document, changes in the speed at which the document passes the reading unit are reduced. Therefore, it is possible to reduce changes in the length of the image which is read by the reading unit.

In the image reading apparatus, the control unit may accelerate the transport speed once the rear end of the document passes the reading unit.

For example, when the previous document is transported at the slow transport speed and the subsequent document is transported at the fast transport speed, the subsequent document may catch up to the previous document. Addressing this point, according to this configuration, since the transport speed is increased once the document passes the reading unit, it is possible to improve throughput while reducing the influence on the image which is read by the reading unit.

The image reading apparatus may further include a transport detection unit which is provided at a position between the feed detection unit and the reading unit in the transport direction, and which detects the document which is transported, and a rotation detection unit which detects a number of rotations of the transport roller, in which the control unit may accelerate the transport speed once the number of rotations which is detected by the rotation detection unit exceeds a predetermined number of times after the transport detection unit detects the rear end of the document.

According to this configuration, it is possible to accurately acquire the position of the document in the transport path based on the detection results of the transport detection unit and the rotation detection unit. Therefore, it is possible to reduce the risk of the transport speed being modified before the document passes the reading units.

The image reading apparatus may further include a discharge roller which discharges the document which is transported by the transport roller, in which the control unit may decelerate a discharge speed at which the discharge roller discharges the document in accordance with decelerating the transport speed.

According to this configuration, since the discharge speed is decelerated in accordance with the decelerating the transport speed, it is possible to reduce the speed difference between the transport speed and the discharge speed. Therefore, it is possible to favorably perform the transferring of the document from the transport roller to the discharge roller and the transporting of the document.

In the image reading apparatus, the transport speed may be faster than a feed speed at which the feed unit feeds the document, and the control unit may accelerate the feed speed when a transport detection unit which detects the document which is transported detects the rear end of the document.

According to this configuration, when the transport detection unit detects the rear end of the document which is previously fed, the control unit accelerates the feed speed. Therefore, it is possible to reduce the speed difference between the feed speed and the transport speed. Therefore, it is possible to smoothly transfer the document which is subsequently fed from the feed unit to the transport roller.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, description will be given of an embodiment of an image reading apparatus with reference to the drawings. The image reading apparatus of the present embodiment is a sheet feed scanner in which a fixed reading unit reads an image of a document which is transported, for example.

First Embodiment

Hereinafter, description will be given of the first embodiment of the image reading apparatus.

Figure 1:
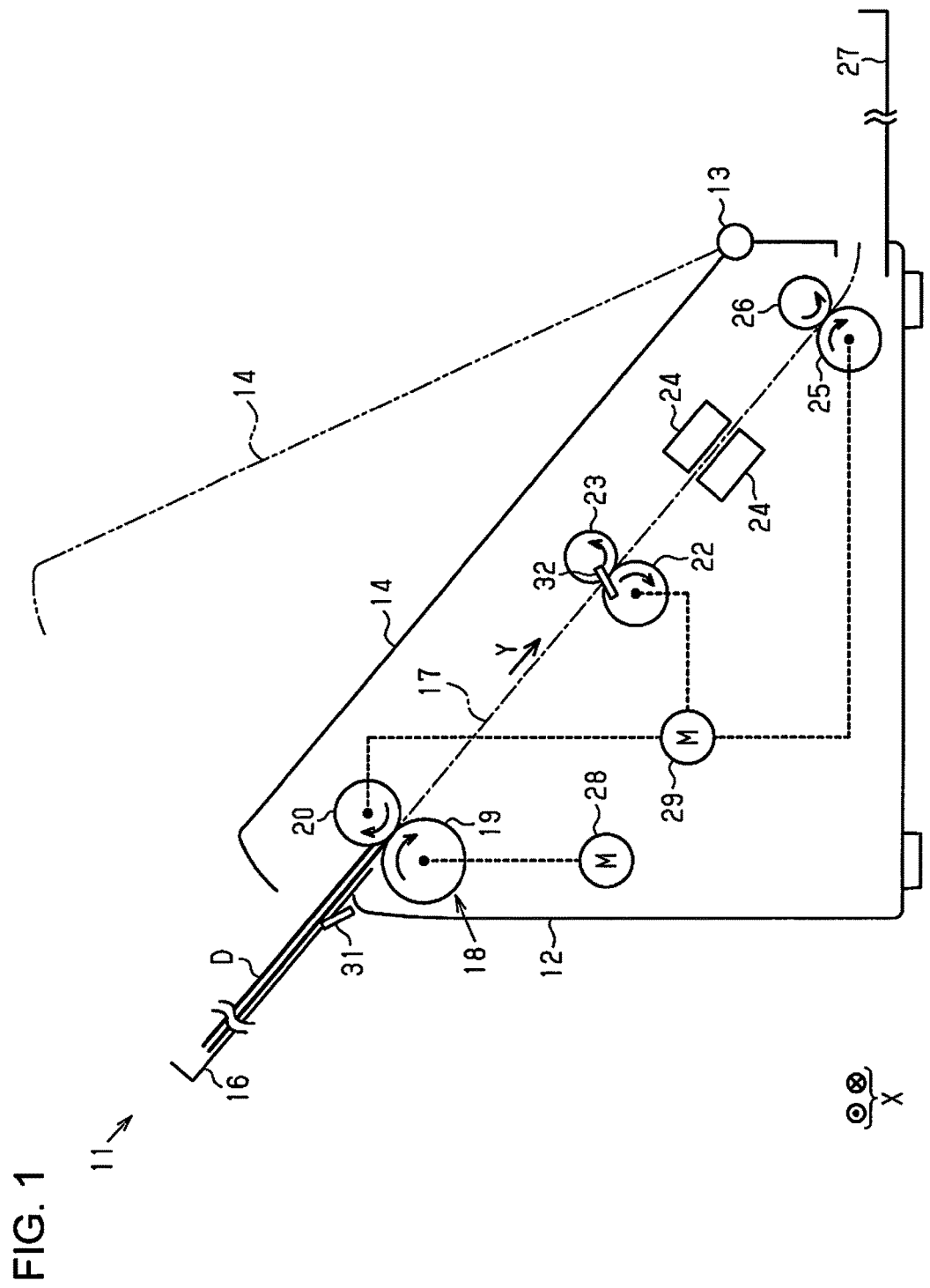
FIG. 1 is a schematic diagram of an embodiment of an image reading apparatus.

As illustrated in FIG. 1, an image reading apparatus 11 is provided with a main body portion 12 and a tilting portion 14. The main body portion 12 has a substantially trapezoidal box shape as viewed from the side surface, and the tilting portion 14 is capable of tilting around a shaft 13 which is provided on the main body portion 12. In other words, the tilting portion 14 tilts between a closed position which is indicated by a solid line in FIG. 1, and an opened position which is indicated by a double-dot-dash line in FIG. 1.

The image reading apparatus 11 is provided with a placement portion 16, and a feed unit 18. It is possible to place a plurality of documents D on the placement portion 16 in a stacked state, and the feed unit 18 feeds the document D from the placement portion 16 toward a transport path 17 which is indicated by a dot-dash line in FIG. 1. The feed unit 18 includes a feed roller 19 and a frictional force application portion 20. The feed roller 19 feeds the document D from the placement portion 16 toward the transport path 17, and the frictional force application portion 20 applies a frictional force toward the opposite side from a transport direction Y between the frictional force application portion 20 and the document D which is fed by the feed roller 19. The frictional force application portion 20 of the present embodiment is a separation roller which rotates in a state of being in contact with the documents D to separate the documents D from each other. The feed unit 18 is provided to be capable of being exchanged by positioning the tilting portion 14 in the opened position. In other words, the feed roller 19 is provided to be capable of being attached and detached with respect to the main body portion 12, and the frictional force application portion 20 is provided to be capable of being attached and detached with respect to the tilting portion 14.

A transport roller 22 which transports the document D along the transport direction Y, and a transport follower roller 23 which rotates to follow the rotation of the transport roller 22 are provided at a position which is closer to the downstream side in the transport direction Y than the feed unit 18 so as to interpose the transport path 17. A pair of reading units 24 which read an image of the document D are provided at a position closer to the downstream side in the transport direction Y than the transport roller 22 so as to extend in a main scanning direction (a width direction X) on both sides, that is, the obverse and the reverse surfaces of the transport path 17. At least one of the reading units of the invention may be provided, and the invention is not limited to the present embodiment.

In other words, the transport roller 22 transports the document D which is fed by the feed unit 18 from the upstream side toward the downstream side in the transport direction Y. The reading unit 24 which is provided on the main body portion 12 reads an image of a first surface (for example, the obverse surface) of the document D which is transported along the transport path 17 from the upstream side to the downstream side in the transport direction Y. The reading unit 24 which is provided on the tilting portion 14 reads an image of a second surface (for example, the reverse surface) of the document D which is transported along the transport path 17 from the upstream side to the downstream side in the transport direction Y.

A discharge roller 25 which causes the document D to be discharged from the main body portion 12, a discharge driven roller 26 which rotates to follow the rotation of the discharge roller 25, and a discharge portion 27 to which the document D is discharged are provided closer to the downstream side in the transport direction Y than the reading units 24.

The image reading apparatus 11 is provided with a feed motor 28 and a transport motor 29. The feed motor 28 is an example of a drive source for rotating the feed roller 19, and the transport motor 29 is a drive source for rotating the transport roller 22. The transport motor 29 is connected to the frictional force application portion 20 and the discharge roller 25, and also rotates the frictional force application portion 20 and the discharge roller 25.

The feed roller 19, the transport roller 22, and the discharge roller 25 rotate forward together with the driving of the feed motor 28 and the transport motor 29 so as to transport the document D from the upstream side to the downstream side in the transport direction Y. The frictional force application portion 20 rotates backward together with the driving of the transport motor 29 so as to apply a frictional force to the document D in the opposite direction from the transport direction Y. The transport roller 22 and the discharge roller 25 rotate faster than the feed roller 19, and the transport speed of the document D by the transport roller 22 is faster than the feed speed of the document D by the feed roller 19.

The image reading apparatus 11 is provided with a document detection unit 31 and a transport detection unit 32. The document detection unit 31 is capable of detecting the document D which is placed on the placement portion 16, and the transport detection unit 32 is capable of detecting the document D which is transported. The transport detection unit 32 is provided in approximately the same position as the transport roller 22 in the transport direction Y. Each of the document detection unit 31 and the transport detection unit 32 of the present embodiment is a contact sensor which includes a lever, for example, and detects the presence or absence of the document D due to the lever being pushed by the document D.

Figure 2:
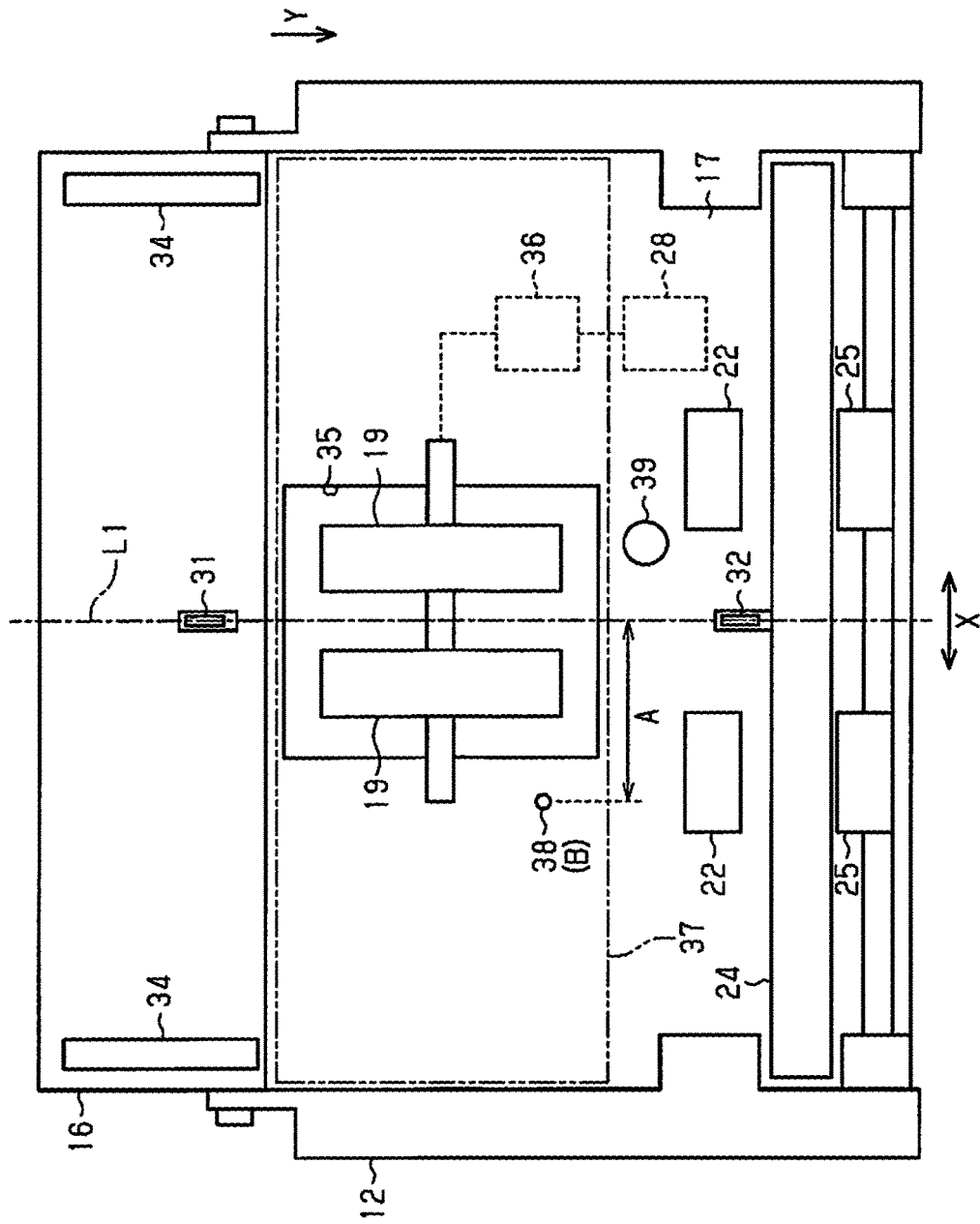
FIG. 2 is a schematic plan diagram of a main body portion.

As illustrated in FIG. 2, a pair of guide portions 34 which guide both ends in the width direction X of the document D which is placed on the placement portion 16 are provided on the placement portion 16. In FIG. 2, a center position in the width direction X of the placement portion 16 and the transport path 17 is indicated using a dot-dash line as a center line L1 along the transport direction Y. The pair of guide portions 34 are provided to be capable of sliding in the width direction X so as to approach each other or separate from each other such that the pair of guide portions 34 have the same distance from the center line L1 in the width direction X as each other. The document detection unit 31 is provided in the center of the placement portion 16 in the width direction X, and the transport detection unit 32 is provided in the center of the transport path 17 in the width direction X.

A housing portion 35 which houses the feed roller 19 is provided at a position between the document detection unit 31 and the transport detection unit 32 in the transport direction Y. The feed roller 19 is housed in the housing portion 35 in a state of being connected to a drive force transmission unit 36 which transmits the drive force of the feed motor 28 to the feed roller 19. The housing portion 35 of the present embodiment is a recessed portion and is covered by a cover 37 in a state in which the feed roller 19 is housed in the housing portion 35. In other words, the cover 37 covers the housing portion 35 in a state in which the feed roller 19 is exposed, and a portion of the transport path 17 is formed by the surface of the cover 37.

The image reading apparatus 11 is provided with a feed detection unit 38 and a multi-feed detection unit 39. The feed detection unit 38 is capable of detecting the document D which is fed by the feed unit 18, and the multi-feed detection unit 39 is capable of detecting multi-feeding of the document D. The feed detection unit 38 is provided in a different position from the housing portion 35, which is a different position from the feed roller 19 in the width direction X which intersects the transport direction Y. The multi-feed detection unit 39 is provided on one side and the feed detection unit 38 is provided on the other side in the width direction X to interpose the center line L1. The feed detection unit 38 is provided at a position which is closer to the upstream side in the transport direction Y than the multi-feed detection unit 39, and is provided at a position which is closer to the upstream side in the transport direction Y than the transport roller 22.

The multi-feed detection unit 39 is provided closer to the drive force transmission unit 36 side than the center line L1 in the width direction X. In other words, the drive force transmission unit 36 is provided on one side and the feed detection unit 38 is provided on the other side in the width direction X to interpose the center line L1.

The feed detection unit 38 is provided at a position in which an interval A from the center line L1 in the width direction X is greater than or equal to 35 mm and less than or equal to 40 mm. The interval A is an interval between the center line L1 and the middle of a detection region B of the feed detection unit 38, and according to the document D of the so-called Bible size, is preferably greater than or equal to 35 mm and less than or equal to 40 mm, and is more preferably greater than or equal to 37 mm and less than or equal to 40 mm.

Next, description will be given of the document D of the Bible size.

Figure 3:
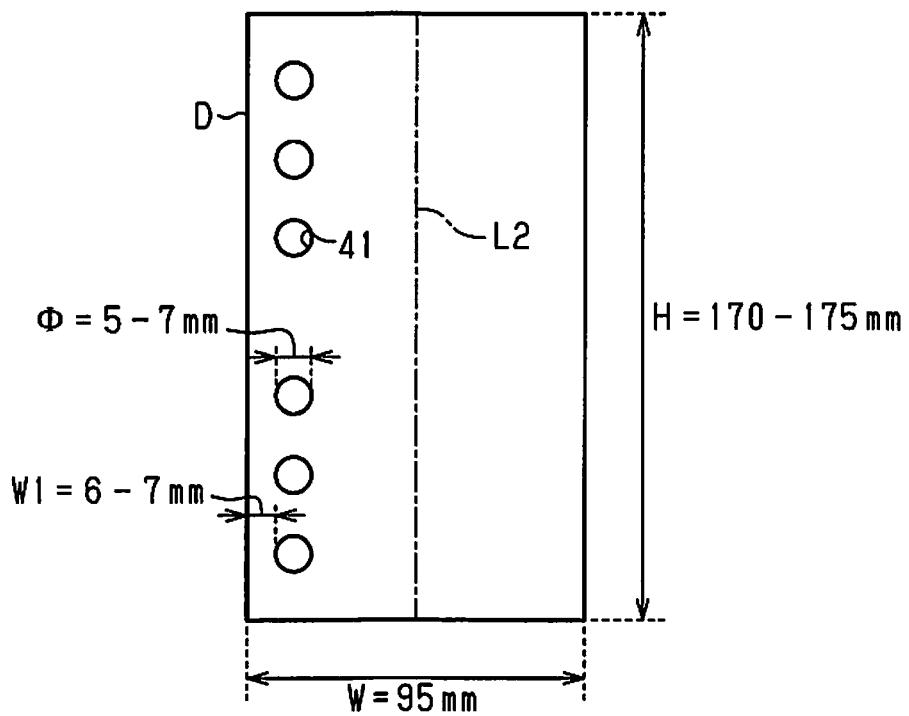
FIG. 3 is a schematic diagram of a document of a Bible size.

As illustrated in FIG. 3, the document D of the Bible size is the document D for exchanging or refilling which is referred to as a refill corresponding to a pocket notebook of a B6 size. The size of the document D is often a rectangular shape with a width W of 95 mm, and a height H of 170 mm to 175 mm. A plurality of (for example, six) holes 41 may be formed along the long side in the document D. A diameter φ of the hole 41 is often 5 mm to 7 mm, and a dimension W1 from the end (the long side) of the document D to the hole 41 is often 6 mm to 7 mm.

In FIG. 3, a middle line L2 of the document D is depicted using a dot-dash line. The middle line L2 is a line which is parallel to the long side, and is a line which passes through the middle of the short side. The document D is placed on the placement portion 16 and is fed and transported so as to align the middle line L2 of the document D with the center line L1 of the image reading apparatus 11.

Figure 4:
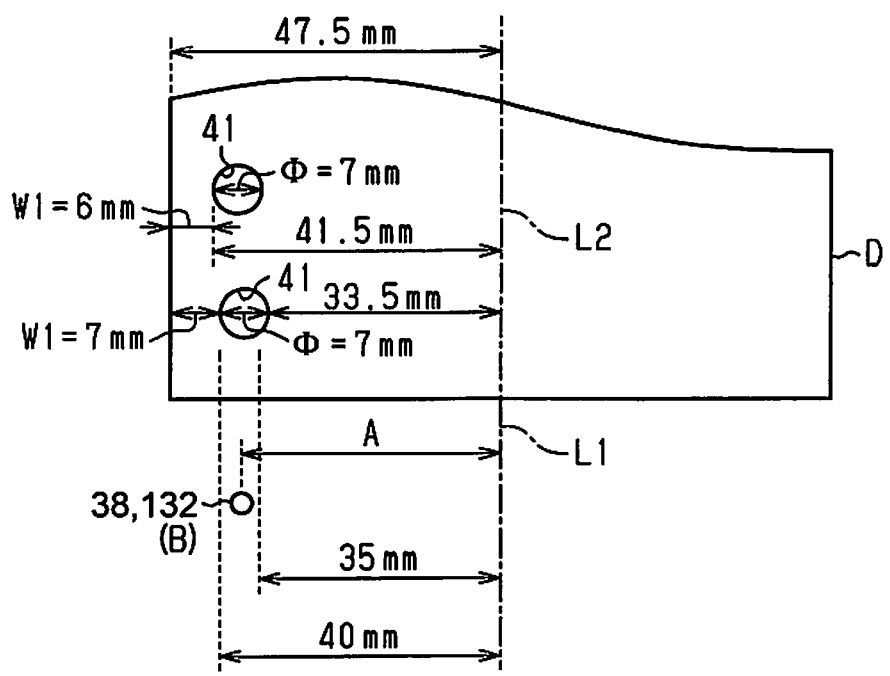
FIG. 4 is a schematic diagram of the document and a feed detection unit.
Figure 5:
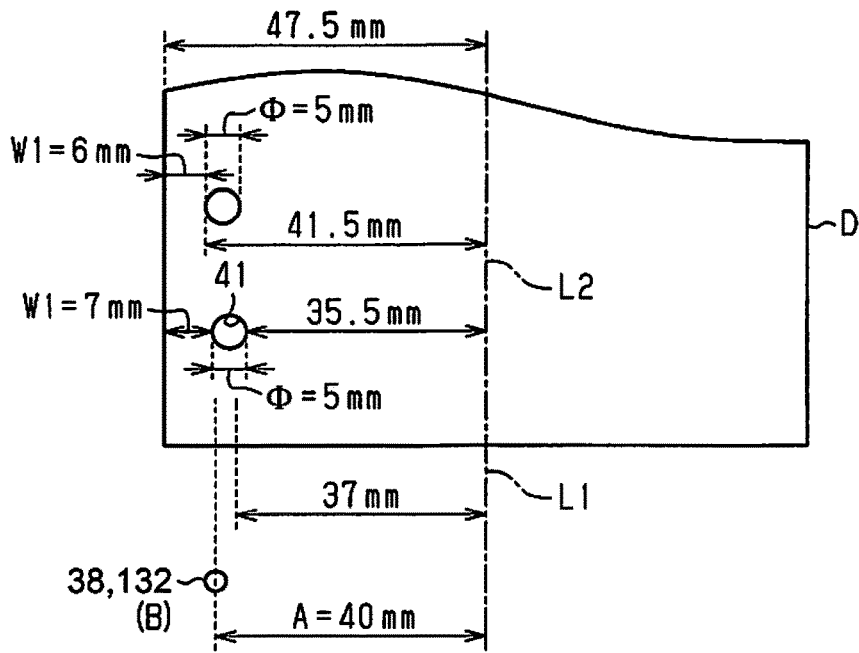
FIG. 5 is a schematic diagram of the document and the feed detection unit.

The diameter φ of the hole 41 and the dimension W1 are defined by the format of each of the documents D; however, in FIGS. 4 and 5, documents D which have holes 41 of different formats are depicted in order to simplify explanation.

In a case in which the diameter φ of the holes 41 is 7 mm as illustrated in FIG. 4, by providing the feed detection unit 38 at a position at which the interval A with the center line L1 is greater than or equal to 35 mm and is less than or equal to 40 mm, at least a portion of the holes 41 of the document D which is transported overlaps with the feed detection unit 38, and it is possible to detect the holes 41 using the feed detection unit 38.

In other words, in a case in which the diameter φ is 7 mm, the holes 41 are positioned in a range of greater than or equal to 33.5 mm and less than or equal to 41.5 mm from the middle line L2. Therefore, by setting the interval A to greater than or equal to 35 mm or less than or equal to 40 mm which is a range closer to the inside than the range in which the holes 41 of the maximum diameter can be formed by the amount of the radius (1.5 mm in the present embodiment) of the detection region B, it is possible to cause the holes 41 with the diameter φ of 7 mm to overlap the feed detection unit 38. In a case in which the diameter φ of the holes 41 is 5 mm, it is possible to cause at least a portion of the holes 41 to overlap the feed detection unit 38.

As illustrated in FIG. 5, the holes 41 with the diameter φ of 5 mm are positioned in a range of greater than or equal to 35.5 mm and less than or equal to 41.5 mm from the middle line L2. Therefore, by setting the interval A to greater than or equal to 37 mm or less than or equal to 40 mm which is a range closer to the inside than the range in which the holes 41 of the minimum diameter can be formed by the amount of the radius of the detection region B, it is possible improve the detection accuracy of the holes 41 by the feed detection unit 38.

Figure 6:
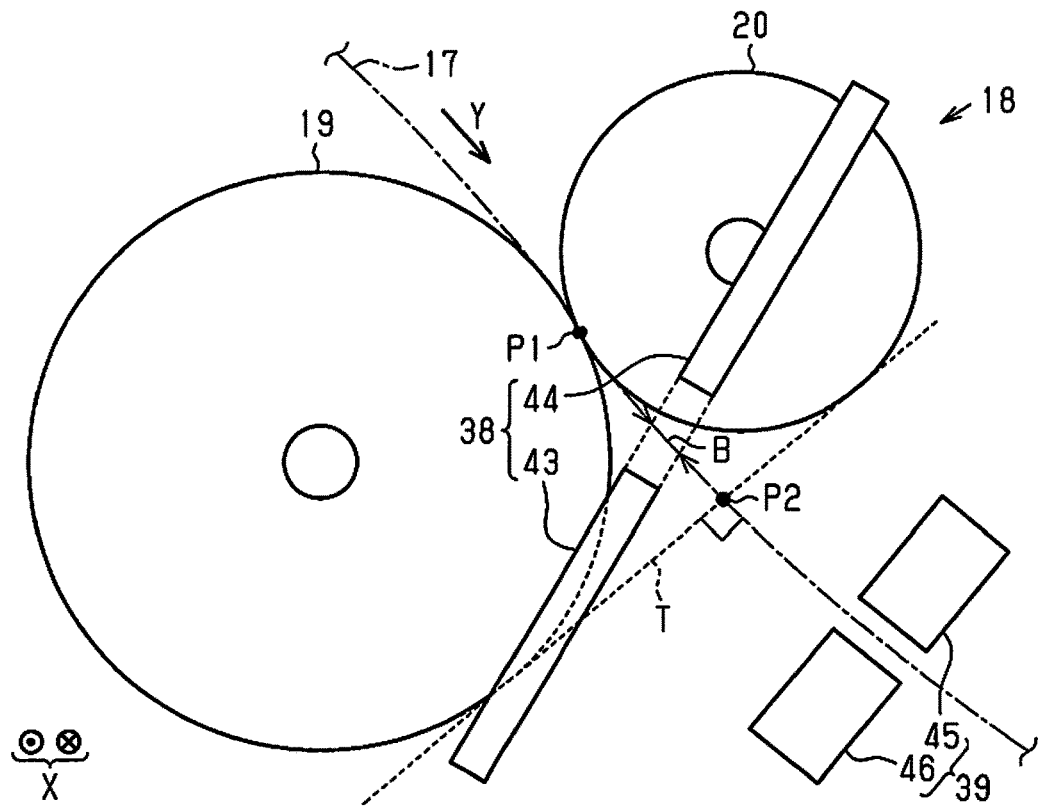
FIG. 6 is a schematic diagram of a feed unit and the feed detection unit.

As illustrated in FIG. 6, the feed detection unit 38 is an optical sensor, and includes a light emitting unit 43 which emits light, and a light receiving unit 44 which receives the light which is emitted by the light emitting unit 43. The light emitting unit 43 and the light receiving unit 44 are disposed in opposing positions to interpose the transport path 17. A region which is a region between the light emitting unit 43 and the light receiving unit 44 and overlaps the transport path 17 is the detection region B. In other words, the light emitting unit 43 emits light toward the detection region B, and the light receiving unit 44 receives the light which passes through the detection region B. Therefore, when the document D is positioned in the detection region B, the light is blocked by the document D, the light reception amount which is received by the light receiving unit 44 is reduced, and the feed detection unit 38 detects the document D.

The feed detection unit 38 is provided such that the detection region B is positioned at a position in the transport direction Y between a pinching position P1 and an intersecting position P2. The pinching position P1 is a position at which the feed roller 19 and the frictional force application portion 20 pinch the document D. The intersecting position P2 is a position closer to the downstream side in the transport direction Y than the pinching position P1 at which a tangential line T of the feed roller 19 intersects the transport path 17 in a perpendicular manner.

The tangential line T is a common tangential line which is in contact with both the side surface of the cylindrical feed roller 19 and the side surface of the cylindrical frictional force application portion 20. In other words, the feed detection unit 38 is provided such that the detection region B is positioned closer to the upstream side in the transport direction Y than the intersecting position P2 which is also an intersecting point between the common tangential line between the feed roller 19 and the frictional force application portion 20 and the transport path 17.

The feed roller 19 and the frictional force application portion 20 are formed of rubber, sponge, or the like, and may elastically deform, for example. In other words, the feed roller 19 and the frictional force application portion 20 may come into surface contact. In this case, a downstream end in the transport direction Y of the surfaces which are contacting each other of the feed roller 19 and the frictional force application portion 20 is the pinching position P1, and the feed detection unit 38 is provided between the pinching position P1 and the intersecting position P2. Therefore, the feed detection unit 38 detects the document D which leaves the feed unit 18.

The multi-feed detection unit 39 is an ultrasonic wave sensor, and a signal transmission unit 45 which is capable of transmitting an ultrasonic wave, and a signal reception unit 46 which is capable of receiving the ultrasonic wave which is transmitted by the signal transmission unit 45 are disposed in opposing positions to interpose the transport path 17. The multi-feed detection unit 39 detects multi-feeding of the document D using the principle that the ultrasonic wave will attenuate in the gap between a plurality of the documents D which are fed overlapped.

Next, description will be given of the electrical configuration of the image reading apparatus 11.

Figure 7:
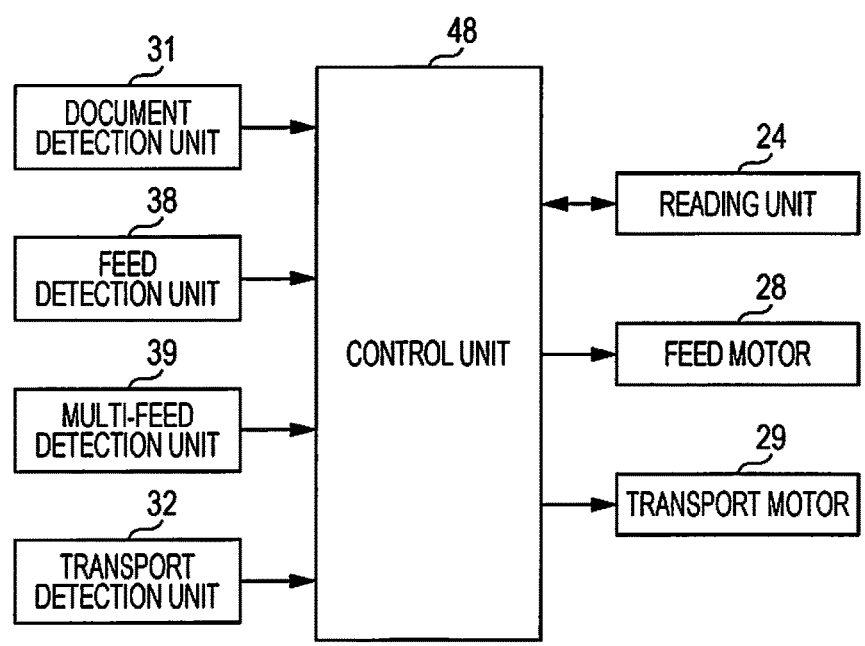
FIG. 7 is a block diagram of a control unit.

As illustrated in FIG. 7, the image reading apparatus 11 is provided with a control unit 48 which performs overall control of the driving of the mechanisms in the image reading apparatus 11. In other words, the control unit 48 controls the driving of the reading units 24, the feed motor 28, and the transport motor 29 based on the detection results of the document detection unit 31, the feed detection unit 38, the multi-feed detection unit 39, and the transport detection unit 32.

Next, with reference to the flowchart illustrated in FIG. 8, description will be given of a feeding method in the image reading apparatus 11 based on the image reading process routine. The image reading process routine is executed at the timing at which a job of reading an image is started.

Figure 8:
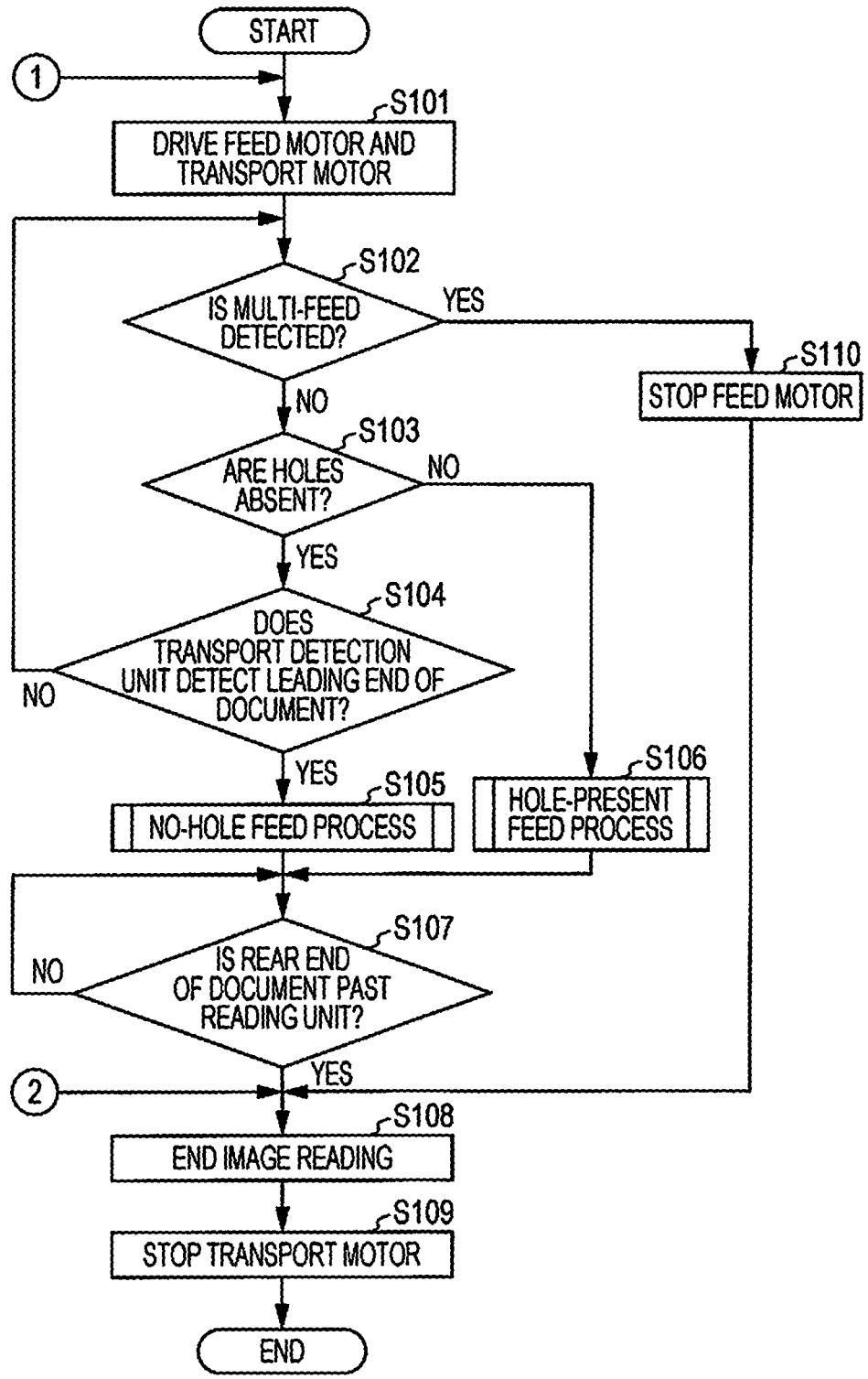
FIG. 8 is a flowchart of an image reading process routine.

As illustrated in FIG. 8, the control unit 48 drives the feed motor 28 and the transport motor 29 in step S101, and causes the feed unit 18 to feed the document D (a first feeding process). In step S102, the control unit 48 determines whether or not the document D is multi-fed based on the detection results of the multi-feed detection unit 39.

In a case in which the multi-feed detection unit 39 does not detect multi-feed (step S102: NO), in step S103, the control unit 48 determines the presence or absence of the holes 41 in the document D based on the detection results of the feed detection unit 38. In a case in which the feed detection unit 38 does not detect the holes 41 (step S103: YES), in step S104, the control unit 48 determines whether or not the transport detection unit 32 detects the leading end of the document D. In other words, in a case in which the transport detection unit 32 does not detect the document D (step S104: NO), the control unit 48 determines that the document D is not transported to the transport detection unit 32, and transitions the process to step S102.

When the transport detection unit 32 detects the document D, the control unit 48 determines that the leading end of the document D is transported to the transport detection unit 32 (step S104: YES), and in step S105, executes the no-hole feed process routine.

In step S103, in a case in which the feed detection unit 38 detects the holes 41 of the document D (step S103: NO), in step S106, the control unit 48 executes the hole-present feed process routine.

In the following step S107, the control unit 48 determines whether or not the rear end of the document D is past the reading units 24. In other words, in a case in which a predetermined time is not elapsed from when the transport detection unit 32 switches from a state of detecting the document D to a state of not detecting the document D, for example, the control unit 48 determines that the rear end of the document D is yet to pass the reading units 24 and waits (step S107: NO). In a case in which the predetermined time is elapsed from when the transport detection unit 32 switches from a state of detecting the document D to a state of not detecting the document D, the control unit 48 determines that the rear end of the document D is past the reading units 24 (step S107: YES).

In step S108, the control unit 48 ends the reading of the image by the reading units 24, and in step S109, stops the transport motor 29 and ends the image reading process routine.

In step S102, when multi-feed is detected by the multi-feed detection unit 39 (step S102: YES), in step S110, the control unit 48 stops the feed motor 28 and transitions the process to step S108.

Next, description will be given of the no-hole feed process routine of step S105 (refer to FIG. 8) with reference to the flowchart illustrated in FIG. 9.

Figure 9:
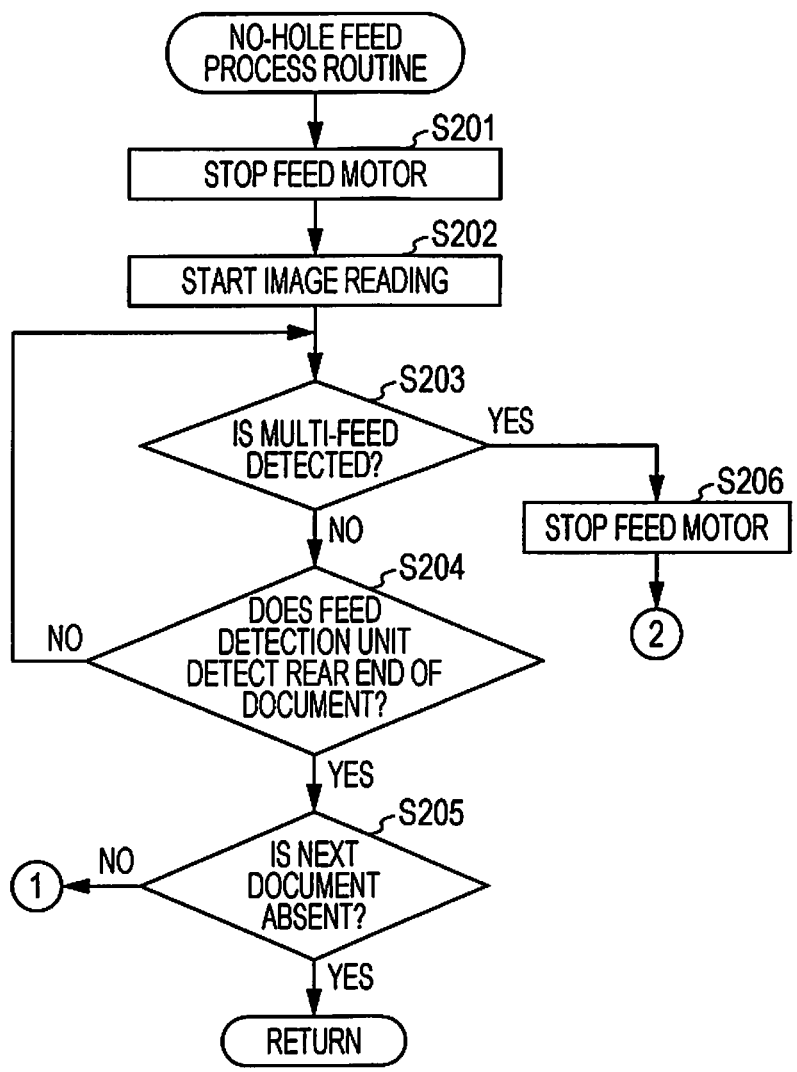
FIG. 9 is a flowchart of a no-hole feed process routine.

As illustrated in FIG. 9, in step S201, the control unit 48 stops the feed motor 28. In step S202, the control unit 48 causes the reading units 24 to start the reading of an image.

In step S203, the control unit 48 determines whether or not the document D is multi-fed based on the detection results of the multi-feed detection unit 39. In a case in which the multi-feed detection unit 39 does not detect multi-feed (step S203: NO), in step S204, the control unit 48 determines whether or not the feed detection unit 38 detects the rear end of the document D (a rear end detection process).

In other words, in a case in which the feed detection unit 38 detects the document D, the control unit 48 determines that the rear end of the document D is yet to pass the feed detection unit 38 (step S204: NO), and transitions the process to step S203. When the detection results of the feed detection unit 38 change from a state in which the document D is detected to a state in which the document D is not detected, the control unit 48 determines that the rear end of the document D is detected by the feed detection unit 38 (step S204: YES), and transitions the process to step S205.

In step S205, the control unit 48 determines whether or not the next document D is placed on the placement portion 16 based on the detection results of the document detection unit 31. In a case in which the document D is placed on the placement portion 16 (step S205: NO), the control unit 48 transitions the process to step S101 (a second feeding process). In other words, the control unit 48 causes the next document D to be fed with the rear end of the document D is detected by the feed detection unit 38.

In a case in which the next document D is not placed on the placement portion 16 (step S205: YES), the control unit 48 ends the no-hole feed process routine and transitions the process to step S107.

In step S203, when multi-feed is detected by the multi-feed detection unit 39 (step S203: YES), in step S206, the control unit 48 stops the feed motor 28 and transitions the process to step S108.

Next, description will be given of the hole-present feed process routine of step S106 (refer to FIG. 8) with reference to the flowchart illustrated in FIG. 10.

Figure 10:
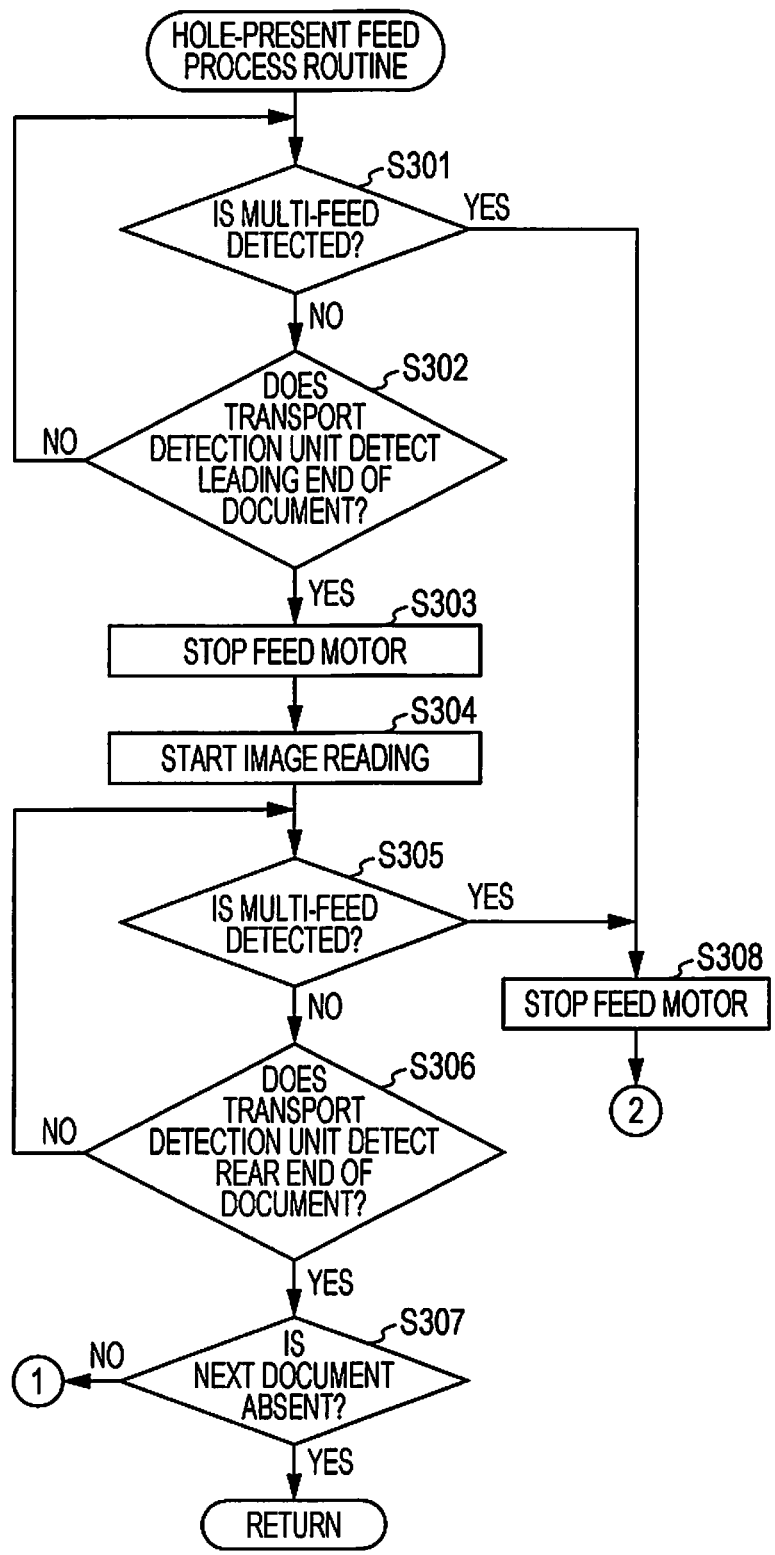
FIG. 10 is a flowchart of a hole-present feed process routine.

As illustrated in FIG. 10, in step S301, the control unit 48 determines whether or not the document D is multi-fed based on the detection results of the multi-feed detection unit 39.

In a case in which the multi-feed detection unit 39 does not detect multi-feed (step S301: NO), in step S302, the control unit 48 determines whether or not the transport detection unit 32 detects the leading end of the document D, and in a case in which the transport detection unit 32 does not detect the document D (step S302: NO), the control unit 48 transitions the process to step S301.

When the transport detection unit 32 detects the document D, the control unit 48 determines that the leading end of the document D is transported to the transport detection unit 32 (step S302: YES), and in step S303, stops the feed motor 28. In step S304, the control unit 48 causes the reading units 24 to start the reading of an image.

In step S305, the control unit 48 determines whether or not the document D is multi-fed based on the detection results of the multi-feed detection unit 39. In a case in which the multi-feed detection unit 39 does not detect multi-feed (step S305: NO), in step S306, the control unit 48 determines whether or not the transport detection unit 32 detects the rear end of the document D.

In other words, in a case in which the transport detection unit 32 detects the document D, the control unit 48 determines that the rear end of the document D is yet to pass the transport detection unit 32 (step S306: NO), and transitions the process to step S305. When the detection results of the transport detection unit 32 change from a state in which the document D is detected to a state in which the document D is not detected, the control unit 48 determines that the rear end of the document D is detected by the transport detection unit 32 (step S306: YES), and transitions the process to step S307.

In step S307, the control unit 48 determines whether or not the next document D is placed on the placement portion 16 based on the detection results of the document detection unit 31. In a case in which the document D is placed on the placement portion 16 (step S307: NO), the control unit 48 transitions the process to step S101. In a case in which the document D is not placed on the placement portion 16 (step S307: YES), the control unit 48 ends the hole-present feed process routine.

In step S301 and step S305, when multi-feed is detected by the multi-feed detection unit 39 (step S301, step S305: YES), in step S308, the control unit 48 stops the feed motor 28 and transitions the process to step S108.

Next, description will be given of the operations of the image reading apparatus 11.

When a job is input to the image reading apparatus 11, the control unit 48 drives the feed motor 28 and the transport motor 29, and feeds and transports the document D.

When the transport detection unit 32 detects the leading end of the document D, the control unit 48 stops the feed motor 28. In other words, when the transport motor 29 is driven, the transport roller 22 rotates to transport the document D, and the feed roller 19 rotates to follow the document D which is transported by the transport roller 22. Meanwhile, the frictional force application portion 20 rotates backward and continues to apply a frictional force to the document D. The reading units 24 read an image of the document D at the timing at which the document D passes.

The control unit 48 modifies the timing at which to feed the next document D according to whether or not the feed detection unit 38 detects the holes 41 in the document D in the time from when the feed detection unit 38 detects the leading end of the document D until when the transport detection unit 32 detects the leading end of the document D. In other words, in a case in which the feed detection unit 38 does not detect the holes 41, the control unit 48 drives the feed motor 28 using the fact that the feed detection unit 38 detects the rear end of the document D as a trigger. In a case in which the feed detection unit 38 detects the holes 41, the control unit 48 drives the feed motor 28 using the fact that the transport detection unit 32 detects the rear end of the document D as a trigger.

According to the embodiment described above, it is possible to obtain the following effects.

(1) Since the feed detection unit 38 is provided to overlap the feed roller 19 in the transport direction Y, in comparison with a case in which the feed detection unit 38 is provided closer to the downstream side in the transport direction Y than the feed roller 19, it is possible to swiftly detect the document D which is fed. Therefore, the interval from when the feeding of the previous document D is completed until when the next document D is fed is shortened by feeding the document D based on the detection results of the feed detection unit 38, for example, and it is possible to improve throughput.

(2) Since the feed detection unit 38 is provided at a position which is closer to the upstream side in the transport direction Y than the transport roller 22, in comparison to a case in which the feed detection unit 38 is provided at a position which is closer to the downstream side in the transport direction Y than the transport roller 22, it is possible to narrow the interval between the documents D in the transport direction Y.

(3) Since the feed detection unit 38 is provided closer to the upstream side in the transport direction Y than the multi-feed detection unit 39, in comparison to a case in which the feed detection unit 38 is provided at a position which is closer to the downstream side in the transport direction Y than the multi-feed detection unit 39, it is possible to narrow the interval between the documents D in the transport direction Y.

(4) The feed detection unit 38 is provided on the opposite side from the multi-feed detection unit 39 to interpose the center of the transport path 17. In other words, since the feed detection unit 38 is provided at a position which is distanced from the multi-feed detection unit 39 in the width direction X, it becomes easier to secure the space for providing the feed detection unit 38.

(5) Since the feed detection unit 38 is provided in a different position from the housing portion 35, in a case in which the housing portion 35 is exposed to the outside such as in a case in which the feed roller 19 is exchanged, for example, it is possible to reduce the risk of the feed detection unit 38 being exposed to the outside.

(6) The feed detection unit 38 is provided on the opposite side from the drive force transmission unit 36 to interpose the center of the transport path 17. In other words, since the feed detection unit 38 is provided at a position which is distanced from the drive force transmission unit 36 in the width direction X, it becomes easier to secure the space for providing the feed detection unit 38.

(7) There is a case in which the holes 41 for passing rings through are formed along the long side in the document D of the so-called Bible size. Since the feed detection unit 38 is provided at a position which the holes 41 which are formed in the document D of the Bible size pass, it is possible to detect the holes 41 which are formed in the document D using the feed detection unit 38.

The first embodiment which is described above can also be modified as described below.

In the embodiment which is described above, the image reading apparatus 11 may feed a carrier sheet interposing the document D and read an image of the document D. A carrier sheet is formed by one end of two transparent sheets being bonded together, and is used in a case in which the document D of a non-standard size is folded in two and read, or the like. Incidentally, since the carrier sheet is a transparent sheet, in a case in which an optical sensor is used for the feed detection unit 38, it is not possible to detect the rear end of the carrier sheet using the feed detection unit 38. Therefore, in a case in which an image of the document D is read while using the carrier sheet, in a case in which the transport detection unit 32 detects the rear end of the carrier sheet, the feed unit 18 may be caused to feed the next document D. Whether the reading target is the document D or is the document D interposed in the carrier sheet may be input from an input unit (not illustrated) by a user. A detection target portion may be provided on the carrier sheet, and the feed detection unit 38 may be caused to detect the detection target portion of the carrier sheet.

In the embodiment which is described above, in a case in which the width W of the document D is smaller than double the size of the interval A between the center line L1 and the feed detection unit 38, the feed unit 18 may be caused to feed the next document D in a case in which the transport detection unit 32 detects the rear end of the document D. In other words, in a case in which the transport detection unit 32 detects the document D whereas the feed detection unit 38 is yet to detect the document D, the control unit 48 may perform execution from step S303 of the hole-present feed process routine which is illustrated in FIG. 10.

In the embodiment which is described above, in a case in which the feed detection unit 38 detects the holes 41, the control unit 48 may execute a process which is set according to the document D of the Bible size. It is possible to set this process arbitrarily, using a joining process in which the images of the obverse surface and the reverse surface of the document D which are read by the pair of reading units 24 are joined, a process in which character information is acquired, or the like.

In the embodiment which is described above, in a case in which the feed detection unit 38 detects one of the holes 41 of the document D in the time from when the feed detection unit 38 detects the leading end of the document D until when the transport detection unit 32 detects the leading end of the document D, the control unit 48 may feed the next document D using the fact that the feed detection unit 38 detects the rear end of the document D as a trigger. In other words, in a case in which the feed detection unit 38 detects a plurality of the holes 41, the next document D may be fed using the fact that the transport detection unit 32 detects the rear end of the document D as a trigger.

In the embodiment which is described above, the document detection unit 31, the transport detection unit 32, the feed detection unit 38, and the multi-feed detection unit 39 may be arbitrary detection units such as those which use contact and those which do not. For example, the feed detection unit 38 may be a contact sensor which includes a lever. For example, the feed detection unit 38 may be an image sensor, and may detect the document D using image processing.

In the embodiment which is described above, a configuration may be adopted in which the discharge roller 25 and the discharge driven roller 26 are not provided.

In the embodiment which is described above, the feed detection unit 38 may be provided at a position which is less than 35 mm from the center line L1 in the width direction X. The feed detection unit 38 may be provided at a position which is distanced from the center line L1 in the width direction X by more than 40 mm.

In the embodiment which is described above, the feed detection unit 38 may be provided closer to the drive force transmission unit 36 than the center line L1. The drive force transmission unit 36 may be provided closer to the feed detection unit 38 side than the center line L1.

In the embodiment which is described above, the image reading apparatus 11 may be configured to not include the feed motor 28. For example, the transport motor 29 may be connected to the drive force transmission unit 36, and whether or not to transmit the drive force of the transport motor 29 to the feed roller 19 may be switched using the drive force transmission unit 36.

In the embodiment which is described above, the feed detection unit 38 may be provided inside the housing portion 35 together with the feed roller 19.

In the embodiment which is described above, the image reading apparatus 11 may be configured to not include the housing portion 35.

In the embodiment which is described above, the feed detection unit 38 may be provided closer to the multi-feed detection unit 39 side than the center line L1. The multi-feed detection unit 39 may be provided closer to the feed detection unit 38 side than the center line L1.

In the embodiment which is described above, a configuration may be adopted in which the transport roller 22 is not provided. In other words, after the document D which is fed by the feed unit 18 is transported to the discharge roller 25 by the feed roller 19, the document D may be transported and discharged by the discharge roller 25.

In the embodiment which is described above, the feed detection unit 38 may be provided in a center position of the width direction X in the transport path 17. In other words, the feed detection unit 38 may be provided on the center line L1. In a case in which a plurality of the feed rollers 19 are provided in the width direction X, the feed detection unit 38 may be provided at a position between the feed rollers 19 in the width direction X.

In the embodiment which is described above, the frictional force application portion 20 may be a separation pad pinches the documents D together with the feed roller 19 to separate the documents D.

In the embodiment which is described above, the image reading apparatus 11 is not limited to a sheet feeding type, and may be a flatbed type image reading apparatus which is provided with an automatic document feeding apparatus (an auto sheet feeder) which automatically feeds the documents D. The image reading apparatus 11 may be applied to a multifunctional device which is configured to be integral with the printing apparatus, a FAX which is provided with a communication function, or the like.

Second Embodiment

Hereinafter, description will be given of a second embodiment of the image reading apparatus.

Figure 11:
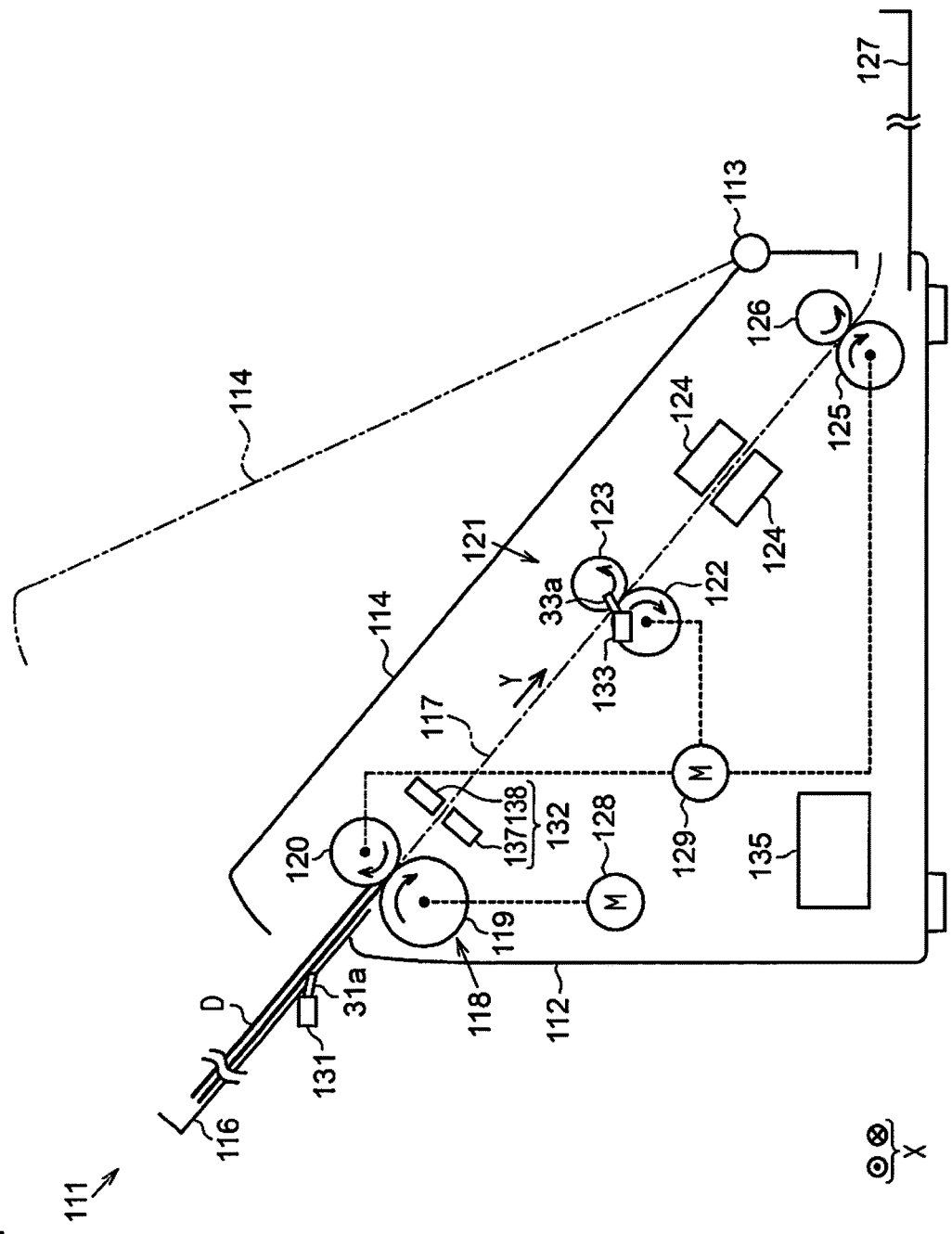
FIG. 11 is a schematic diagram of an embodiment of an image reading apparatus.

As illustrated in FIG. 11, an image reading apparatus 111 is provided with a main body portion 112 and a tilting portion 114. The main body portion 112 has a substantially trapezoidal box shape as viewed from the side surface, and the tilting portion 114 is capable of tilting around a shaft 113 which is provided on the main body portion 112. In other words, the tilting portion 114 tilts between a closed position which is indicated by a solid line in FIG. 11, and an opened position which is indicated by a double-dot-dash line in FIG. 11.

The image reading apparatus 111 is provided with a placement portion 116, and a feed unit 118. It is possible to place a plurality of documents D on the placement portion 116 in a stacked state, and the feed unit 118 feeds the document D from the placement portion 116 toward a transport path 117 which is indicated by a dot-dash line in FIG. 11. The feed unit 118 includes a feed roller 119 and a frictional force application portion 120. The feed roller 119 feeds the document D, and the frictional force application portion 120 causes a frictional force to be generated between the frictional force application portion 120 and the document D which is fed by the feed roller 119. The frictional force application portion 120 of the present embodiment is a separation roller which rotates in a state of being in contact with the documents D to separate the documents D from each other.

A transport unit 121 which transports the document D which is fed by the feed unit 118 from the upstream side to the downstream side in the transport direction Y is provided at a position which is closer to the downstream side in the transport direction Y than the feed unit 118. The transport unit 121 includes a transport roller 122 which transports the document D, and a transport follower roller 123 which rotates to follow the rotation of the transport roller 122. The transport roller 122 and the transport follower roller 123 are provided to interpose the transport path 117.

A pair of reading units 124 which read an image of the document D which is transported are provided at a position closer to the downstream side in the transport direction Y than the transport unit 121 so as to extend in the main scanning direction (the width direction X) on both sides, that is, the obverse and the reverse surfaces of the transport path 117. At least one of the reading units of the invention may be provided, and the invention is not limited to the present embodiment.

In other words, the reading unit 124 which is provided on the main body portion 112 reads an image of the first surface (for example, the obverse surface) of the document D which is transported along the transport path 117 from the upstream side toward the downstream side in the transport direction Y. The reading unit 124 which is provided on the tilting portion 114 reads an image of the second surface (for example, the reverse surface) of the document D which is transported along the transport path 117 from the upstream side to the downstream side in the transport direction Y.

A discharge roller 125 which causes the document D to be discharged from the main body portion 112, a discharge driven roller 126 which rotates to follow the rotation of the discharge roller 125, and a discharge portion 127 to which the document D is discharged are provided closer to the downstream side in the transport direction Y than the reading units 124.

The image reading apparatus 111 is provided with a feed motor 128 and a transport motor 129. The feed motor 128 is a drive source for rotating the feed roller 119, and the transport motor 129 is a drive source for rotating the transport roller 122. The transport motor 129 is connected to the frictional force application portion 120 and a discharge roller 125, and also rotates the frictional force application portion 120 and the discharge roller 125. The feed roller 119, the transport roller 122, and the discharge roller 125 rotate forward together with the driving of the feed motor 128 and the transport motor 129 so as to transport the document D from the upstream side to the downstream side in the transport direction Y. The frictional force application portion 120 rotates backward together with the driving of the transport motor 129 so as to apply a frictional force to the document D in the opposite direction from the transport direction Y.

The image reading apparatus 111 is provided with a placement detection unit 131 and the feed detection unit 132. The placement detection unit 131 is capable of detecting the document D which is placed on the placement portion 116, and the feed detection unit 132 is capable of detecting the document D which is fed by the feed unit 118. The image reading apparatus 111 is further provided with a transport detection unit 133, and a control unit 135. The transport detection unit 133 is capable of detecting the document D which is transported along the transport path 117 from the upstream side toward the downstream side in the transport direction Y, and the control unit 135 performs overall control of the driving of the mechanisms in the image reading apparatus 111 such as the feed unit 118.

The feed detection unit 132 is an optical sensor which includes a light emitting unit 137 which emits light, and a light receiving unit 138 which receives the light which is emitted from the light emitting unit 137. The light emitting unit 137 and the light receiving unit 138 are disposed in opposing positions to interpose the transport path 117.

The transport detection unit 133 is provided at a position which is closer to the downstream side in the transport direction Y than the feed detection unit 132, which is substantially the same position as the transport roller 122 in the transport direction Y. The placement detection unit 131 and the transport detection unit 133 are contact sensors which include contact portions 31*a* and 33*a* such as levers, for example, which come into contact with the document D, and detect the presence or absence of the document D due to the contact portions 31*a* and 33*a* being pushed and displaced by the document D.

Figure 12:
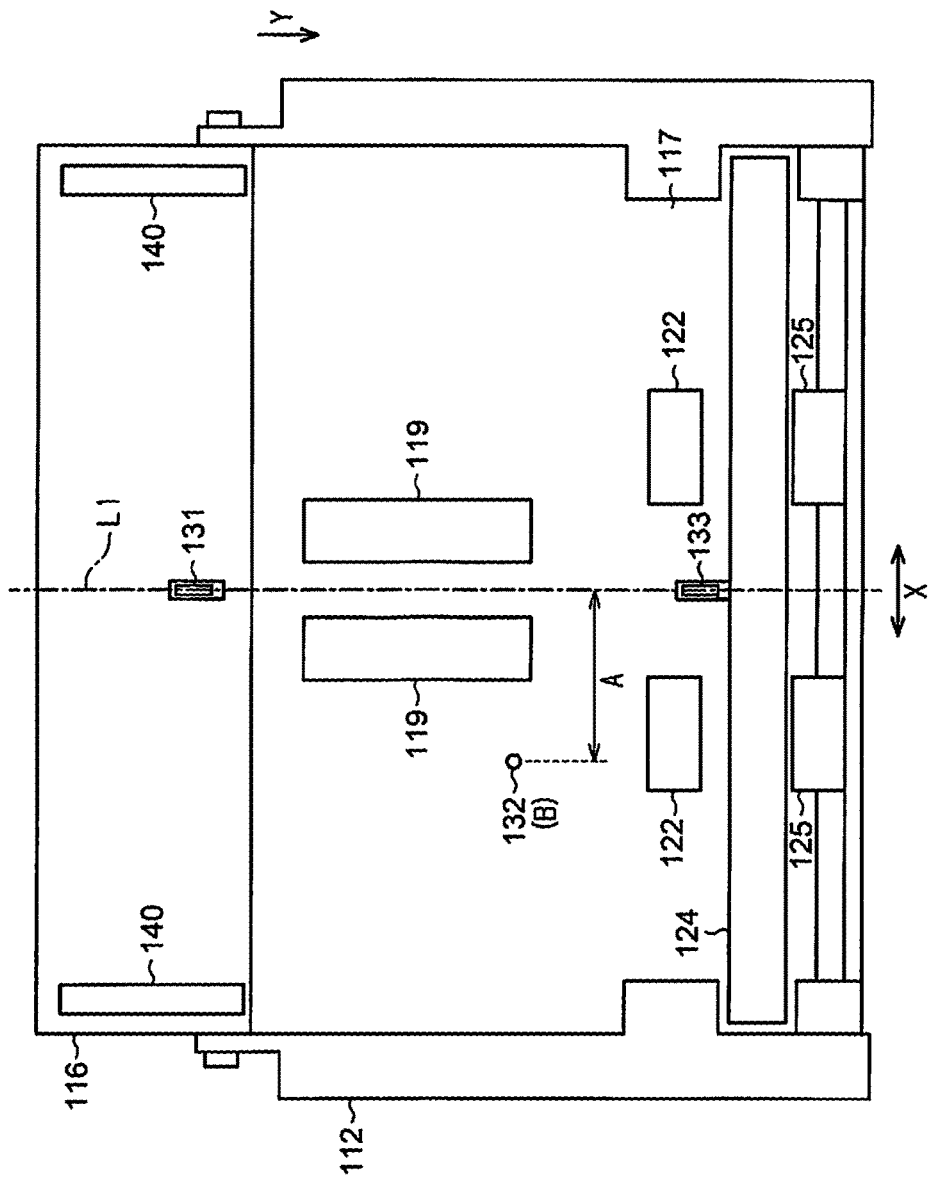
FIG. 12 is a schematic plan diagram of a main body portion.

As illustrated in FIG. 12, a pair of guide portions 140 which guide both ends in the width direction X which intersects the transport direction Y of the document D which is placed on the placement portion 116 are provided on the placement portion 116. In FIG. 12, a center position in the width direction X of the placement portion 116 and the transport path 117 is indicated using a dot-dash line as the center line L1 along the transport direction Y. The pair of guide portions 140 are provided to be capable of sliding in the width direction X so as to approach each other or separate from each other such that the pair of guide portions 140 have the same distance from the center line L1 in the width direction X as each other. The placement detection unit 131 is provided in the center of the placement portion 116 in the width direction X, and the transport detection unit 133 is provided in the center of the transport path 117 in the width direction X.

The feed detection unit 132 is provided in a different position from the center of the transport path 117 in the width direction X. In other words, the feed detection unit 132 and the transport detection unit 133 are provided in different positions in the width direction X. Specifically, the feed detection unit 132 is provided at a position in which the interval A from the center line L1 in the width direction X is greater than or equal to 35 mm and less than or equal to 40 mm.

The interval A is an interval between the center line L1 and the middle of the detection region B of the feed detection unit 132, and according to the document D of the so-called Bible size, is preferably greater than or equal to 35 mm and less than or equal to 40 mm, and is more preferably greater than or equal to 37 mm and less than or equal to 40 mm.

The detection region B is a region above the transport path 117, the light emitting unit 137 emits light toward the detection region B, and the light receiving unit 138 receives the light which passes through the detection region B.

Next, description will be given of the document D of the Bible size. The document D of the Bible size of the present embodiment is the same as in the first embodiment, and thus description thereof will be omitted.

As illustrated in FIG. 3, the document D is placed on the placement portion 116 and is fed and transported so as to align the middle line L2 of the document D with the center line L1 of the image reading apparatus 111 or so as to cause the middle line L2 to be substantially perpendicular to the center line L1. In a case in which the middle line L2 is caused to be substantially perpendicular to the center line L1, the document D is placed such that the holes 41 are positioned closer to the downstream side in the transport direction Y than the middle line L2, and is transported.

In a case in which the diameter $\phi$ of the holes 41 is 7 mm as illustrated in FIG. 4, by providing the feed detection unit 132 at a position at which the interval A with the center line L1 is greater than or equal to 35 mm and is less than or equal to 40 mm, at least a portion of the holes 41 of the document D which is transported overlaps with the feed detection unit 132, and it is possible to detect the holes 41 using the feed detection unit 132.

In other words, in a case in which the diameter $\phi$ is 7 mm, the holes 41 are positioned in a range of greater than or equal to 33.5 mm and less than or equal to 41.5 mm from the middle line L2. Therefore, by setting the interval A to greater than or equal to 35 mm or less than or equal to 40 mm which is a range closer to the inside than the range in which the holes 41 of the maximum diameter can be formed by the amount of the radius (1.5 mm in the present embodiment) of the detection region B, it is possible to cause the holes 41 with the diameter $\phi$ of 7 mm to overlap the feed detection unit 132.

In a case in which the diameter $\phi$ of the holes 41 is 5 mm, it is possible to cause at least a portion of the holes 41 to overlap the feed detection unit 132.

As illustrated in FIG. 5, the holes 41 with the diameter $\phi$ of 5 mm are positioned in a range of greater than or equal to 35.5 mm and less than or equal to 41.5 mm from the middle line L2. Therefore, by setting the interval A to greater than or equal to 37 mm or less than or equal to 40 mm which is a range closer to the inside than the range in which the holes 41 of the minimum diameter can be formed by the amount of the radius of the detection region B, it is possible improve the detection accuracy of the holes 41 by the feed detection unit 132.

Next, description will be given of the electrical configuration of the image reading apparatus 111.

Figure 13:
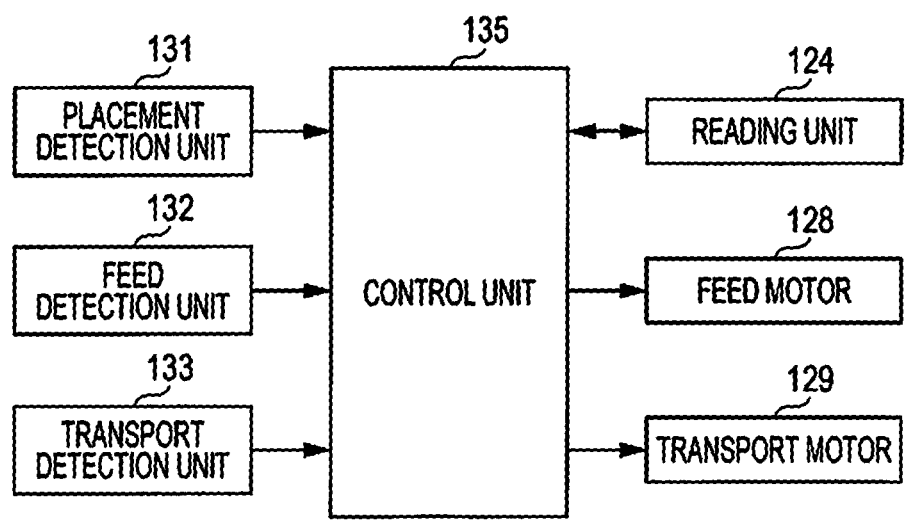
FIG. 13 is a block diagram of a control unit.

As illustrated in FIG. 13, the control unit 135 controls the driving of the reading units 124, the feed motor 128, and the transport motor 129 based on the detection results of the placement detection unit 131, the feed detection unit 132, and the transport detection unit 133.

Next, description will be given of the detection method in which the feed detection unit 132 and the transport detection unit 133 detect the document D.

Figure 14:
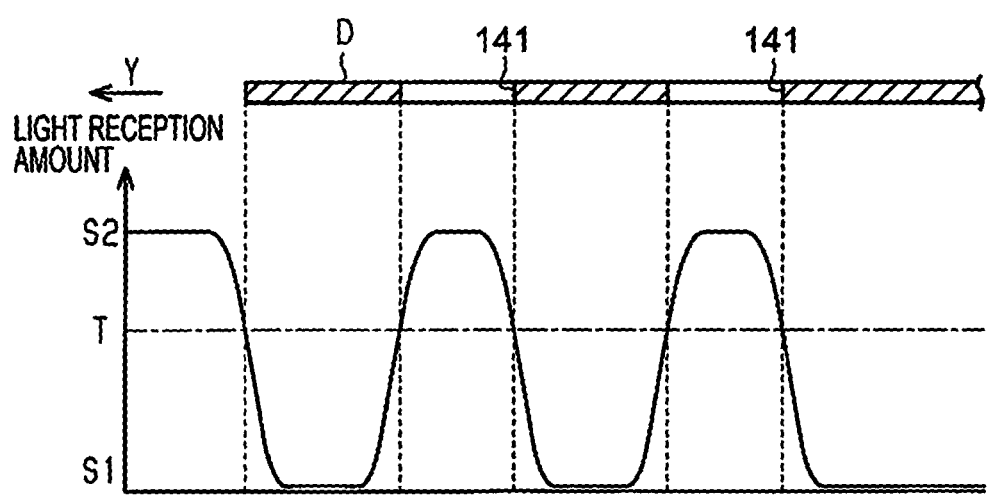
FIG. 14 is a schematic sectional diagram of a document and a graph illustrating a light reception amount of a light receiving unit.

As illustrated in FIG. 14, the feed detection unit 132 detects the presence or absence of the document D according to the light reception amount which is received by the light receiving unit 138, and outputs a detection signal S1 in which the document D is detected and a non-detection signal S2 in which the document D is not detected. Specifically, in a case in which the light reception amount is greater than a threshold T, the feed detection unit 132 outputs the non-detection signal S2, and in a case in which the light is blocked by the document D and the light reception amount is less than the threshold T, the feed detection unit 132 outputs the detection signal S1.

The transport detection unit 133 detects the presence or absence of the document D according to the displacement of the contact portion 31a, and outputs the detection signal S1 in which the document D is detected and the non-detection signal S2 in which the document D is not detected in the same manner as the feed detection unit 132.

Therefore, the feed detection unit 132 and the transport detection unit 133 output the non-detection signal S2 before the document D is fed, and the signal to be output switches to the detection signal S1 at the timing at which the leading end of the document D pass through. The feed detection unit 132 and the transport detection unit 133 temporarily output the non-detection signal S2 at the timing at which the holes 41 pass through.

Next, with reference to the flowcharts illustrated in FIGS. 15A and 15B, description will be given of a feeding method in the image reading apparatus 111 based on the image reading process routine. The image reading process routine is executed at the timing at which a job of reading an image is started.

Figure 15A:
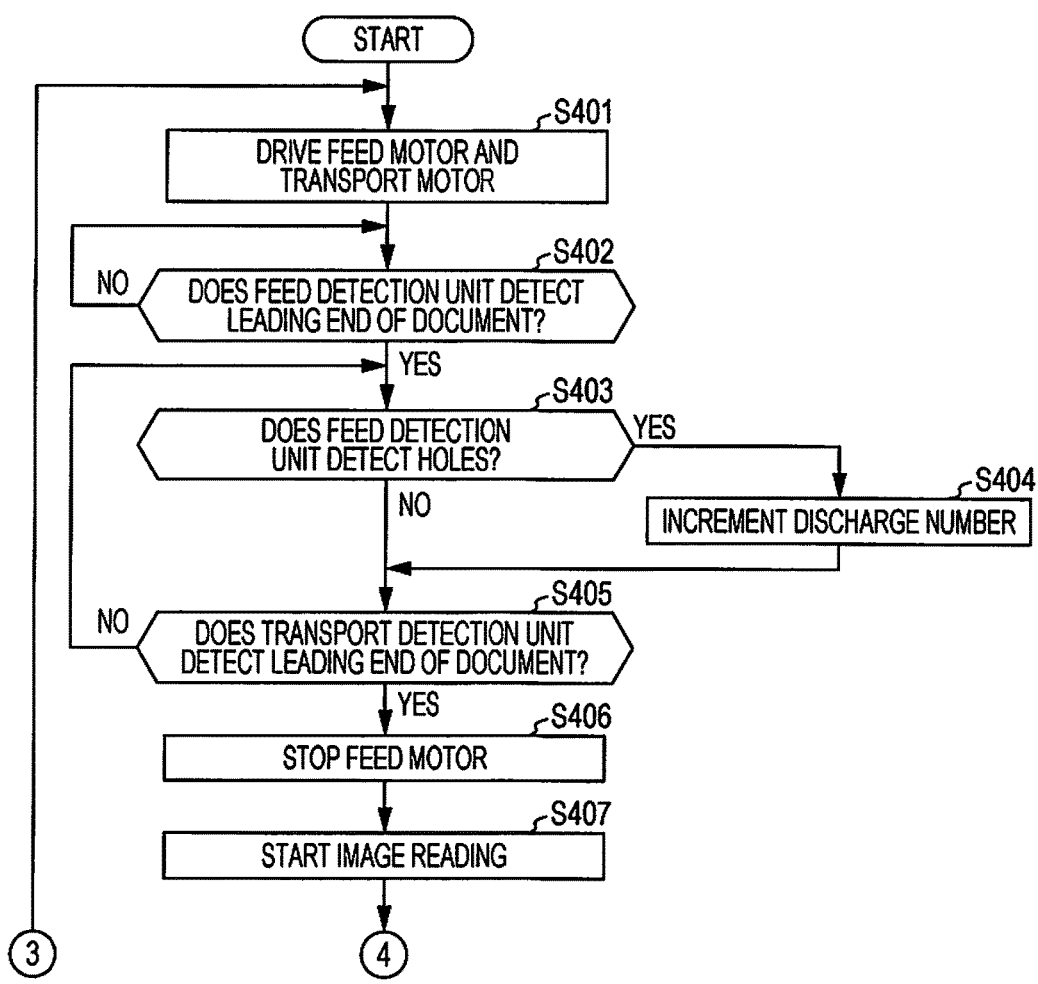
FIGS. 15A and 15B are flowcharts of an image reading process routine.
Figure 15B:
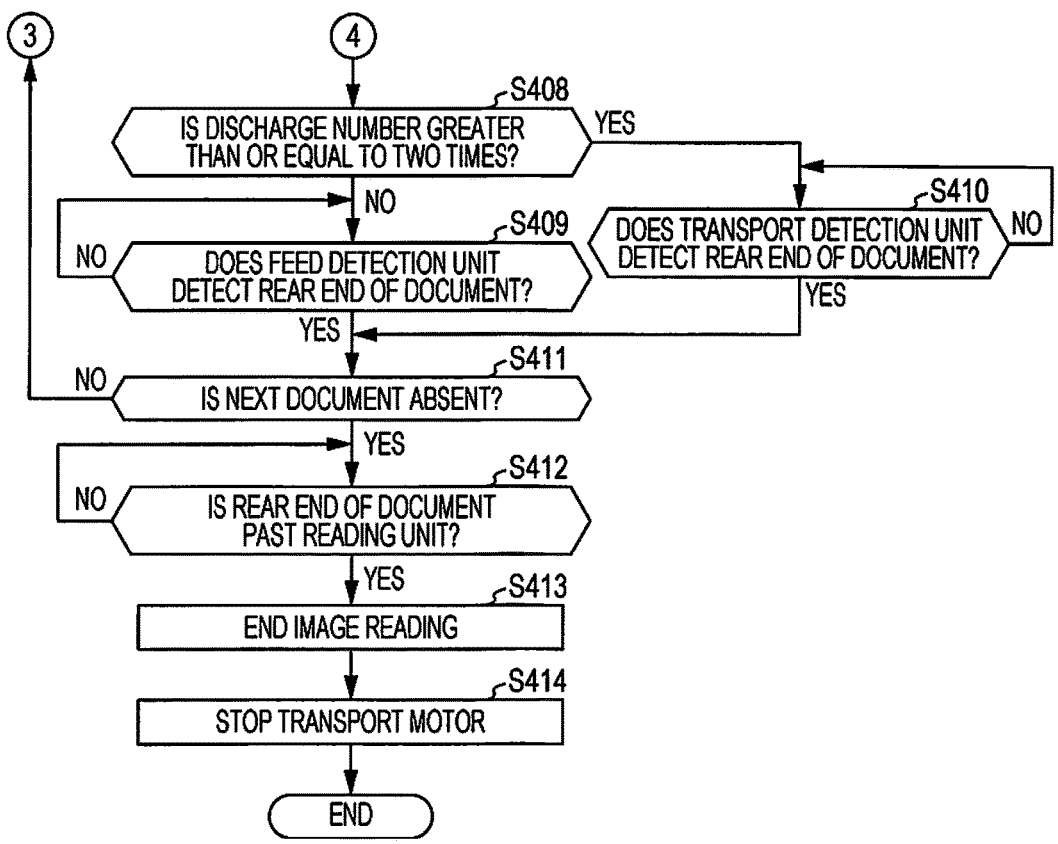

As illustrated in FIGS. 15A and 15B, the control unit 135 drives the feed motor 128 and the transport motor 129 in step S401, and causes the feed unit 118 to feed the document D (the first feeding process). In step S402, the control unit 135 determines whether or not the feed detection unit 132 detects the leading end of the document D. In other words, in a case in which the non-detection signal S2 is output from the feed detection unit 132 and the feed detection unit 132 does not detect the document D (step S402: NO), the control unit 135 determines that the document D is yet to be fed to the feed detection unit 132, and waits until the document D is fed.

When the control unit 135 acquires the detection signal S1 which is output from the feed detection unit 132 (a feed signal acquisition process), the control unit 135 determines that the leading end of the document D is transported to the feed detection unit 132 (step S402: YES), and transitions the process to step S403.

In step S403, the control unit 135 determines whether or not the feed detection unit 132 detects the holes 41 which are formed in the document D. In other words, when the signal which is output from the feed detection unit 132 switches from the detection signal S1 to the non-detection signal S2, the control unit 135 determines that the holes 41 are detected (step S403: YES), in step S404, increments a discharge number which is the number of times the non-detection signal S2 is output, and transitions the process to step S405.

In a case in which the non-detection signal S2 is not output from the feed detection unit 132, the control unit 135 determines that the holes 41 are not detected (step S403: NO), and transitions the process to step S405.

In step S405, the control unit 135 determines whether or not the transport detection unit 133 detects the leading end of the document D.

In other words, in a case in which the non-detection signal S2 is output from the transport detection unit 133 and the transport detection unit 133 does not detect the document D (step S405: NO), the control unit 135 determines that the document D is not transported to the transport detection unit 133, and transitions the process to step S403. When the control unit 135 acquires the detection signal S1 which is output from the transport detection unit 133 (a transport signal acquisition process), the control unit 135 determines that the leading end of the document D is transported to the transport detection unit 133 (step S405: YES).

In step S406, the control unit 135 causes the feed motor 128 to stop, and further, in step S407, causes the reading units 124 to start the reading of an image. In the following step S408, the control unit 135 determines whether or not the discharge number which is incremented in step S404 is greater than or equal to two times.

The discharge number is the number of times that the non-detection signal S2 is output from the feed detection unit 132 during the time from when the detection signal S1 which is output from the feed detection unit 132 in step S402 is acquired until when the detection signal S1 which is output from the transport detection unit 133 in step S405 is acquired.

In a case in which the discharge number is less than or equal to one time (step S408: NO), the control unit 135 transitions the process to step S409. In a case in which the discharge number is greater than or equal to two times (step S408: YES), the control unit 135 transitions the process to step S410.

In step S409, the control unit 135 determines whether or not the feed detection unit 132 detects the rear end of the document D. In other words, in a case in which the detection signal S1 is output from the feed detection unit 132 and the feed detection unit 132 detects the document D, the control unit 135 determines that the document D is yet to pass the feed detection unit 132, and waits (step S409: NO). When the non-detection signal S2 is output from the feed detection unit 132, the control unit 135 determines that the feed detection unit 132 detects the rear end of the document D (step S409: YES), and transitions the process to step S411.

In step S410, the control unit 135 determines whether or not the transport detection unit 133 detects the rear end of the document D. In other words, in a case in which the detection signal S1 is output from the transport detection unit 133 and the transport detection unit 133 detects the document D, the control unit 135 determines that the document D is yet to pass the transport detection unit 133, and waits (step S410: NO). When the non-detection signal S2 is output from the transport detection unit 133, the control unit 135 determines that the transport detection unit 133 detects the rear end of the document D (step S410: YES), and transitions the process to step S411.

In step S411, the control unit 135 determines whether or not the next document D is placed on the placement portion 116 based on the detection results of the placement detection unit 131. In a case in which the document D is placed on the placement portion 116 (step S411: NO), the control unit 135 transitions the process to step S401 and feeds the next document D using the feed unit 118 (the second feeding process).

In other words, in a case in which the discharge number is less than or equal to one time in step S408, when the non-detection signal S2 is output from the feed detection unit 132 after the detection signal S1 is output from the transport detection unit 133 in step S405, the control unit 135 causes the next document D to be fed in step S401. In a case in which the discharge number is greater than or equal to two times in step S408, when the non-detection signal S2 is output from the transport detection unit 133, the control unit 135 causes the next document D to be fed in step S401.

In a case in which the next document D is not placed on the placement portion 116 (step S411: YES), in step S412, the control unit 135 determines whether or not the rear end of the document D is past the reading units 124. In other words, in a case in which a predetermined time is not elapsed from when the transport detection unit 133 outputs the non-detection signal S2, for example, the control unit 135 determines that the rear end of the document D is yet to pass the reading units 124 and waits (step S412: NO). In a case in which the predetermined time is elapsed from when the transport detection unit 133 outputs the non-detection signal S2, the control unit 135 determines that the rear end of the document D is past the reading units 124 (step S412: YES).

In step S413, the control unit 135 ends the reading of the image by the reading units 124, and in step S414, stops the transport motor 129 and ends the image reading process routine.

Next, description will be given of the operations of the image reading apparatus 111.

When a job is input to the image reading apparatus 111, the control unit 135 drives the feed motor 128 and the transport motor 129, and feeds and transports the document D.

When the transport detection unit 133 detects the leading end of the document D, the control unit 135 stops the feed motor 128. In other words, since the transport motor 129 is being driven, the transport roller 122 rotates to transport the document D, and the feed roller 119 rotates to follow the document D which is transported by the transport roller 122. Meanwhile, the frictional force application portion 120 rotates backward and continues to apply a frictional force to the document D. The reading units 124 read an image of the document D at the timing at which the document D passes.

The control unit 135 controls the driving of the feed unit 118 according to the number of the holes 41 which are detected by the feed detection unit 132 in the time from when the feed detection unit 132 detects the leading end of the document D until when the transport detection unit 133 detects the leading end of the document D. In other words, the control unit 135 controls the driving of the feed unit 118 based on the discharge number which is the number of times the feed detection unit 132 outputs the non-detection signal S2 in the time from when the feed detection unit 132 outputs the detection signal S1 until when the transport detection unit 133 outputs the detection signal S1.

In other words, in a case in which the document D is transported in a state in which the middle line L2 of the document D is substantially perpendicular to the center line L1 of the image reading apparatus 111, or in a case in which the document D in which the holes 41 are not formed is transported, the discharge number of the non-detection signal S2 becomes less than or equal to one. In this case, the control unit 135 drives the feed motor 128 using the fact that the feed detection unit 132 detects the rear end of the document D as a trigger. In other words, the control unit 135 drives the feed unit 118 when the feed detection unit 132 outputs the non-detection signal S2 after the transport detection unit 133 outputs the detection signal S1.

In a case in which the document D of the Bible size is aligned such that the center line L1 matches the middle line L2, the discharge number of the non-detection signal S2 is greater or equal to two times. In this case, the control unit 135 drives the feed motor 128 using the fact that the transport detection unit 133 detects the rear end of the document D as a trigger. In other words, the control unit 135 drives the feed unit 118 when the transport detection unit 133 outputs the non-detection signal S2.

According to the embodiment described above, it is possible to obtain the following effects.

(1) The plurality of holes 41 are formed in the document D to form a row as in refills of a loose leaf file or a notebook, for example. When the holes 41 pass the feed detection unit 132, the non-detection signal S2 in which the document D is not detected is output from the feed detection unit 132. Therefore, in a case in which the feeding is performed with the row of the holes 41 aligned to the transport direction Y, for example, there is a possibility that the feed detection unit 132 will output the non-detection signal S2 two or more times. In a case in which the row of the holes 41 is caused to be perpendicular to the transport direction Y and the document D is fed, the non-detection signal S2 which is output by the feed detection unit 132 is output one or less times. The control unit 135 controls the driving of the feed unit 118 based on the discharge number of the non-detection signal S2. In other words, in a case in which the feed detection unit 132 outputs the non-detection signal S2 a plurality of times, and there is a great risk that the holes 41 which are formed in the document D will be erroneously detected as the rear end of the document D, the control unit 135 drives the feed unit 118 when the transport detection unit 133 outputs the non-detection signal S2. Therefore, it is possible to reduce the risk of the document D being fed in an overlapped state.

(2) The holes 41 in the document D are often formed on the edge of the document D. Since the feed detection unit 132 is provided at a different position from the center in the width direction X, in comparison to a case in which the feed detection unit 132 is provided in the center in the width direction X, it is possible to increase the probability of the feed detection unit 132 detecting the holes 41 of the document D.

(3) The feed detection unit 132 which includes the light emitting unit 137 and the light receiving unit 138, and the transport detection unit 133 which includes the contact portion 31a each detects the document D using a different system. Therefore, the detection units of both the feed detection unit 132 and the transport detection unit 133 are capable of reducing the risk of the holes 41 which are formed in the document D being erroneously detected as the rear end of the document D.

(4) The feed detection unit 132 and the transport detection unit 133 are provided in different positions in the width direction X. Therefore, in a case in which the row of the holes 41 is caused to match the transport direction Y and the document D is fed, and the feed detection unit 132 detects the plurality of holes 41, the transport detection unit 133 does not detect the holes 41. Therefore, by feeding the next document D based on the detection results of the transport detection unit 133, it is possible to reduce the risk of the document D being fed in an overlapped state.

(5) There is a case in which the holes 41 for passing rings through are formed along the long side in the document D of the so-called Bible size. Since the feed detection unit 132 is provided at a position which the holes 41 which are formed in the document D of the Bible size pass, it is possible to detect the holes 41 which are formed in the document D using the feed detection unit 132.

(6) In a case in which the discharge number which is the number of times the feed detection unit 132 outputs the non-detection signal S2 is less than or equal to one time, and it is unlikely that the holes 41 in the document D will be erroneously detected as the rear end of the document D, the control unit 135 drives the feed unit 118 when the feed detection unit 132 outputs the non-detection signal S2. In other words, since it is possible to shorten the interval from when the feeding of the previous document D is completed until when the feeding of the next document D is started, it is possible to improve the throughput.

Furthermore, the embodiment described above may also be modified as described below.

In the embodiment which is described above, the image reading apparatus 111 may feed a carrier sheet interposing the document D and read an image of the document D. A carrier sheet is formed by one end of two transparent sheets being bonded together, and is used in a case in which the document D of a non-standard size is folded in two and read, or the like. Incidentally, since the carrier sheet is a transparent sheet, in a case in which an optical sensor is used for the feed detection unit 132, it is not possible to detect the rear end of the carrier sheet using the feed detection unit 132. Therefore, in a case in which an image of the document D is read while using the carrier sheet, in a case in which the transport detection unit 133 detects the rear end of the carrier sheet, the feed unit 118 may be caused to feed the next document D. Whether the reading target is the document D or is the document D interposed in the carrier sheet may be input from an input unit (not illustrated) by a user. A detection target portion may be provided on the carrier sheet, and the feed detection unit 132 may be caused to detect the detection target portion of the carrier sheet.

In the embodiment which is described above, the frictional force application portion 120 may be a separation pad pinches the documents D together with the feed roller 119 to separate the documents D.

In the embodiment which is described above, in a case in which the width W of the document D is smaller than double the size of the interval A between the center line L1 and the feed detection unit 132, the feed unit 118 may be caused to feed the next document D when the transport detection unit 133 detects the rear end of the document D.

In the embodiment which is described above, in a case in which the discharge number is greater than or equal to two, the control unit 135 may execute a process which is set according to the document D of the Bible size. It is possible to set this process arbitrarily, using a joining process in which the images of the obverse surface and the reverse surface of the document D which are read by the pair of reading units 124 are joined, a process in which character information is acquired, or the like.

In the embodiment which is described above, the placement detection unit 131, the transport detection unit 133, and the feed detection unit 132 may be arbitrary detection units such as those which use contact and those which do not. For example, the feed detection unit 132 may be a contact sensor which includes a lever. For example, the transport detection unit 133 may be an optical sensor. The feed detection unit 132 and the transport detection unit 133 may be image sensors which detect the document D using image processing, or ultrasonic wave sensors which detect the document D according to the degree of attenuation of an ultrasonic wave.

In the embodiment which is described above, a configuration may be adopted in which the discharge roller 125 and the discharge driven roller 126 are not provided.

In the embodiment which is described above, a configuration may be adopted in which the transport unit 121 is not provided. In other words, after the document D which is fed by the feed unit 118 is transported to the discharge roller 125 by the feed roller 119, the document D may be transported and discharged by the discharge roller 125.

In the embodiment which is described above, the feed detection unit 132 may be provided at a position which is less than 35 mm from the center line L1 in the width direction X. The feed detection unit 132 may be provided at a position which is distanced from the center line L1 in the width direction X by more than 40 mm.

In the embodiment which is described above, the feed detection unit 132 and the transport detection unit 133 may be provided in the same position in the width direction X. The feed detection unit 132 may be provided in a center position of the width direction X in the transport path 117.

In the embodiment which is described above, the image reading apparatus 111 is not limited to a sheet feeding type, and may be a flatbed type image reading apparatus which is provided with an automatic document feeding apparatus (an auto sheet feeder) which automatically feeds the documents D. The image reading apparatus 111 may be applied to a multifunctional device which is configured to be integral with the printing apparatus, a FAX which is provided with a communication function, or the like.

Third Embodiment

Hereinafter, description will be given of the third embodiment of the image reading apparatus.

Figure 16:
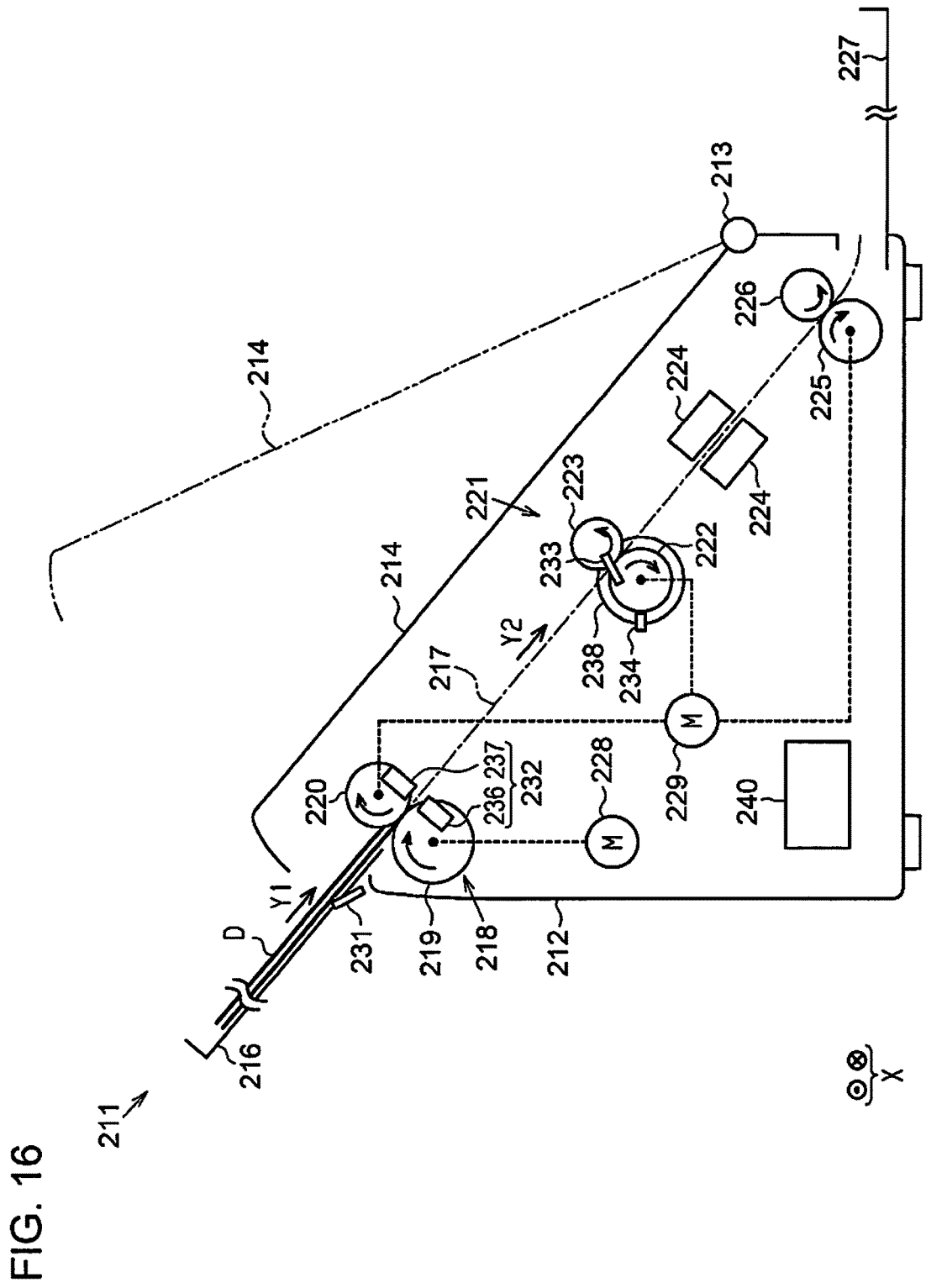
FIG. 16 is a schematic diagram of an embodiment of an image reading apparatus.

As illustrated in FIG. 16, an image reading apparatus 211 is provided with a main body portion 212 and a tilting portion 214. The main body portion 212 has a substantially trapezoidal box shape as viewed from the side surface, and the tilting portion 214 is capable of tilting around a shaft 213 which is provided on the main body portion 212. In other words, the tilting portion 214 tilts between a closed position which is indicated by a solid line in FIG. 16, and an opened position which is indicated by a double-dot-dash line in FIG. 16.

The image reading apparatus 211 is provided with a placement portion 216, and a feed unit 218. It is possible to place a plurality of documents D on the placement portion 216 in a stacked state, and the feed unit 218 feeds the document D from the placement portion 216 toward a transport path 217 which is indicated by a dot-dash line in FIG. 16. The feed unit 218 includes a feed roller 219 and a frictional force application portion 220 and feeds the document D in a feed direction Y1. The feed roller 219 feeds the document D, and the frictional force application portion 220 causes a frictional force to be generated between the frictional force application portion 220 and the document D which is fed by the feed roller 219. The frictional force application portion 220 of the present embodiment is a separation roller which rotates in a state of being in contact with the documents D to separate the documents D from each other.

A transport unit 221 which transports the document D which is fed by the feed unit 218 from the upstream side to the downstream side in a transport direction Y2 is provided at a position which is closer to the downstream side in the transport direction Y2 than the frictional force application portion 220. The feed direction Y1 and the transport direction Y2 of the present embodiment are substantially the same direction. The transport unit 221 includes a transport roller 222 which transports the document D, and a transport follower roller 223 which rotates to follow the rotation of the transport roller 222. The transport roller 222 and the transport follower roller 223 are provided to interpose the transport path 217.

A pair of reading units 224 which read an image of the document D which is transported by the transport roller 222 are provided at a position closer to the downstream side in the transport direction Y2 than the transport roller 222 so as to extend in the main scanning direction (the width direction X) on both sides, that is, the obverse and the reverse surfaces of the transport path 217. At least one of the reading units of the invention may be provided, and the invention is not limited to the present embodiment.

In other words, the reading unit 224 which is provided on the main body portion 212 reads an image of the first surface (for example, the obverse surface) of the document D which is transported along the transport path 217 from the upstream side toward the downstream side in the transport direction Y2. The reading unit 224 which is provided on the tilting portion 214 reads an image of a second surface (for example, the reverse surface) of the document D which is transported along the transport path 217 from the upstream side toward the downstream side in the transport direction Y2.

A discharge roller 225 which discharges the document D which is transported using the transport roller 222, a discharge driven roller 226 which rotates to follow the rotation of the discharge roller 225, and a discharge portion 227 to which the document D is discharged are provided closer to the downstream side in the transport direction Y2 than the reading units 224.

The image reading apparatus 211 is provided with a feed motor 228 and a transport motor 229. The feed motor 228 is a drive source for rotating the feed roller 219, and the transport motor 229 is a drive source for rotating the transport roller 222. The transport motor 229 is connected to the frictional force application portion 220 and the discharge roller 225, and also rotates the frictional force application portion 220 and the discharge roller 225.

The feed roller 219, the transport roller 222, and the discharge roller 225 rotate forward together with the driving of the feed motor 228 and the transport motor 229 so as to transport the document D from the upstream side to the downstream side in the feed direction Y1 and the transport direction Y2. The frictional force application portion 220 rotates backward together with the driving of the transport motor 229 so as to apply a frictional force to the opposite side of the document D from the feed direction Y1. The transport roller 222 and the discharge roller 225 rotate faster than the feed roller 219, and a transport speed (refer to FIG. 20) Vb at which the transport roller 222 transports the document D is faster than a feed speed (refer to FIG. 20) Va at which the feed unit 218 feeds the document D. The transport roller 222 and the discharge roller 225 rotate at approximately the same speed, and the discharge speed at which the discharge roller 225 discharges the document D is approximately the same speed as the transport speed Vb.

The image reading apparatus 211 is provided with a placement detection unit 231 and a feed detection unit 232. The placement detection unit 231 is capable of detecting the document D which is placed on the placement portion 216, and the feed detection unit 232 is provided closer to the downstream side in the feed direction Y1 than the frictional force application portion 220 and is capable of detecting the document D which is fed by the feed unit 218. The image reading apparatus 211 is provided with a transport detection unit 233, and a rotation detection unit 234. The transport detection unit 233 is capable of detecting the document D which is transported, and the rotation detection unit 234 detects the number of rotations of the transport roller 222. The transport detection unit 233 is provided at a position between the feed detection unit 232 and the reading unit 224 in the transport direction Y2 which is substantially the same position as the transport roller 222.

Each of the placement detection unit 231 and the transport detection unit 233 is a contact sensor which includes a lever, for example, and detects the presence or absence of the document D due to the lever being pushed by the document D. The feed detection unit 232 is an optical sensor which includes a light emitting unit 236 which emits light, and a light receiving unit 237 which receives the light which is emitted from the light emitting unit 236. The rotation detection unit 234 is a rotary encoder, for example, and detects an estimate of an encoder scale 238 which rotates together with the transport roller 222. The image reading apparatus 211 is provided with a control unit 240 which performs overall control of the driving of the mechanisms in the image reading apparatus 211 such as the transport roller 222.

Figure 17:
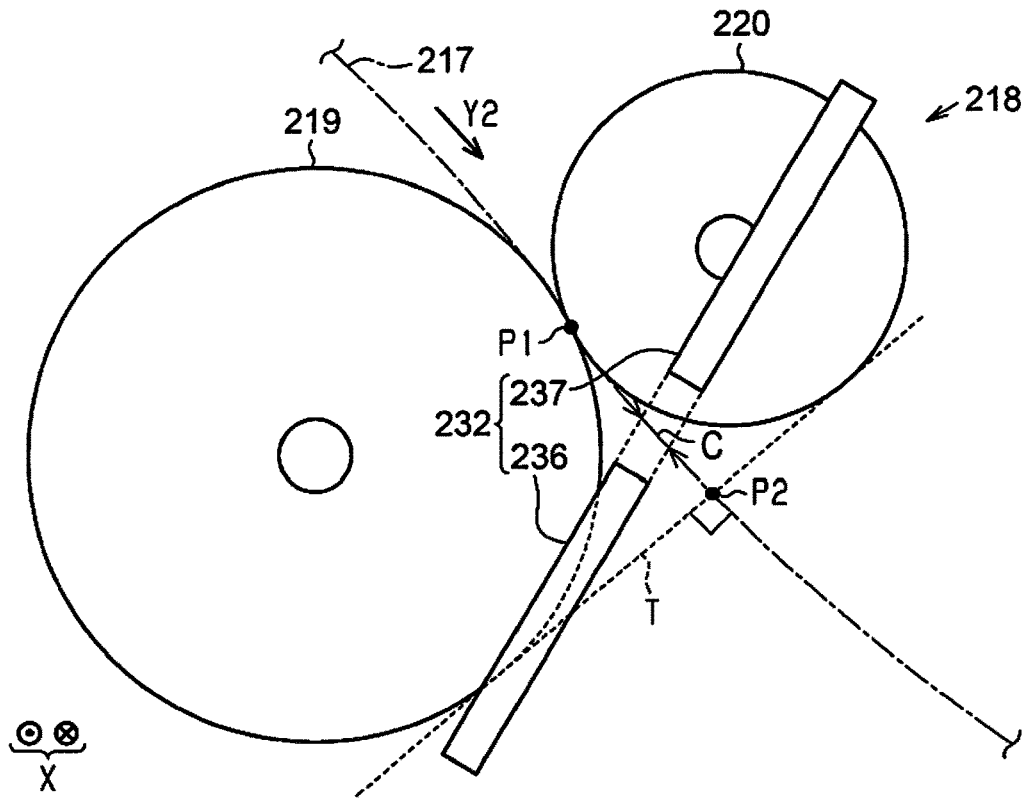
FIG. 17 is a schematic diagram of a feed unit and a feed detection unit.

As illustrated in FIG. 17, in the feed detection unit 232, the light emitting unit 236 and the light receiving unit 237 are provided in substantially the same position as the feed roller 219 in the transport direction Y2 so as to face each other interposing the transport path 217. The light emitting unit 236 emits light toward a detection region C on the transport path 217, and the light receiving unit 237 receives the light which passes through the detection region C. Therefore, when the document D is positioned in the detection region C, the light is blocked by the document D, the light reception amount which is received by the light receiving unit 237 is reduced, and the feed detection unit 232 detects the document D.

The feed detection unit 232 is provided such that the detection region C is positioned at a position in the transport direction Y2 between the pinching position P1 and the intersecting position P2. The pinching position P1 is a position at which the feed roller 219 and the frictional force application portion 220 pinch the document D. The intersecting position P2 is a position closer to the downstream side in the transport direction Y2 than the pinching position P1 at which a tangential line T of the feed roller 219 intersects the transport path 217 in a perpendicular manner.

The tangential line T is a common tangential line which is in contact with both the side surface of the cylindrical feed roller 219 and the side surface of the cylindrical frictional force application portion 220. In other words, the feed detection unit 232 is provided such that the detection region C is positioned closer to the upstream side in the transport direction Y2 than the intersecting position P2 which is also an intersecting point between the common tangential line between the feed roller 219 and the frictional force application portion 220 and the transport path 217.

The feed roller 219 and the frictional force application portion 220 are formed of rubber, sponge, or the like, and may elastically deform, for example. In other words, the feed roller 219 and the frictional force application portion 220 may come into surface contact. In this case, a downstream end in the transport direction Y2 of the surfaces which are contacting each other of the feed roller 219 and the frictional force application portion 220 is the pinching position P1, and the feed detection unit 232 is provided between the pinching position P1 and the intersecting position P2. Therefore, the feed detection unit 232 detects the document D which is past the feed unit 218.

Next, description will be given of the electrical configuration of the image reading apparatus 211.

Figure 18:
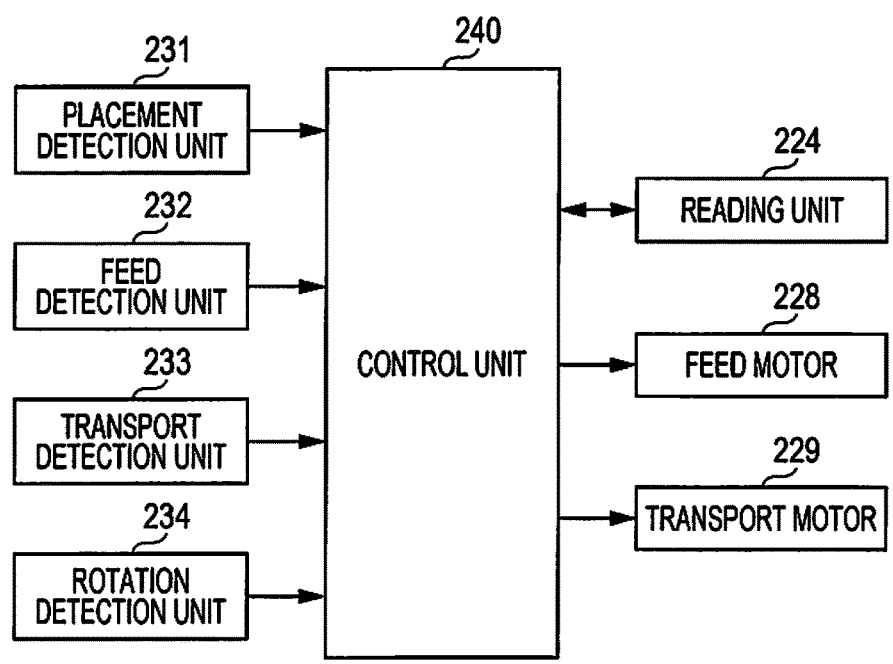
FIG. 18 is a block diagram of a control unit.

As illustrated in FIG. 18, the control unit 240 controls the driving of the reading units 224, the feed motor 228, and the transport motor 229 based on the detection results of the placement detection unit 231, the feed detection unit 232, the transport detection unit 233, and the rotation detection unit 234.

Next, with reference to the flowchart illustrated in FIG. 19, description will be given of a transport method of the document D in the image reading apparatus 211 based on the image reading process routine. The image reading process routine is executed at the timing at which a job of reading an image is input.

Figure 19:
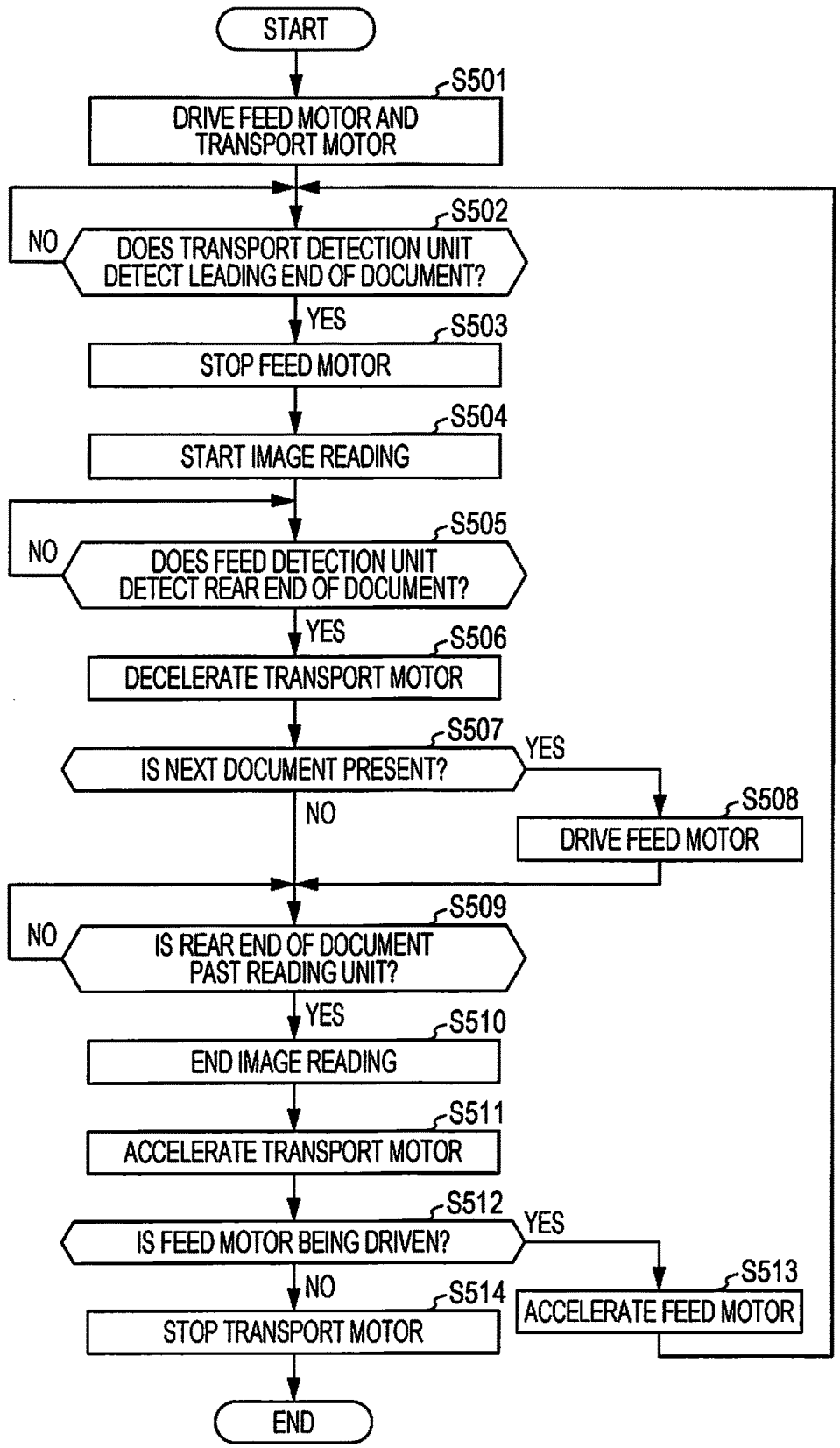
FIG. 19 is a flowchart of an image reading process routine.

As illustrated in FIG. 19, the control unit 240 drives the feed motor 228 and the transport motor 229 in step S501, causes the feed unit 218 to feed the document D (the feeding process), and causes the transport roller 222 to transport the document D which is fed (a transport process).

In step S502, the control unit 240 determines whether or not the transport detection unit 233 detects the leading end (the downstream end in the transport direction Y2) of the document D. In a case in which the transport detection unit 233 does not detect the document D (step S502: NO), the control unit 240 waits while the feed motor 228 and the transport motor 229 are still driven.

When the transport detection unit 233 detects the document D, the control unit 240 determines that the leading end of the document D is transported to the transport detection unit 233 (step S502: YES), and in step S503, stops the feed motor 228. In step S504, the control unit 240 causes the reading units 224 to start reading the image, and in the following step S505, causes the feed detection unit 232 to detect the rear end of the document D (the rear end detection process).

In other words, in a case in which the feed detection unit 232 detects the document D, the control unit 240 determines that the document D is yet to pass the feed detection unit 232 and waits (step S505: NO). When the detection results of the feed detection unit 232 change from a state in which the document D is detected to a state in which the document D is not detected, the control unit 240 determines that the rear end of the document D is detected by the feed detection unit 232 (step S505: YES). In step S506, the control unit 240 decelerates the transport motor 229, and the transport roller 222 causes the transport speed Vb at which the document D is transported to slow down (a decelerating process).

In step S507, the control unit 240 determines whether or not the next document D is placed on the placement portion 216 based on the detection results of the placement detection unit 231. In a case in which the document D is placed on the placement portion 216 (step S507: YES), the control unit 240 drives the feed motor 228 in step S508 and transitions the process to step S509. In a case in which the document D is not placed on the placement portion 216 (step S507: NO), in step S509, the control unit 240 determines whether or not the rear end of the document D is past the reading units 224.

In other words, in a case in which the number of rotations of the transport roller 222 from when the transport detection unit 233 detects the rear end of the document D is less than a predetermined number of times, the control unit 240 determines that the rear end is yet to pass the reading units 224 and waits (step S509: NO). In a case in which the number of rotations of the transport roller 222 from when the transport detection unit 233 detects the rear end of the document D exceeds a predetermined number of times (for example, 0.5 rotations), the control unit 240 determines that the rear end of the document D is past the reading units 224 (step S509: YES). The predetermined number of times is set according to the type of the image reading apparatus 211, and is a value which is obtained by dividing the distance from the transport roller 222 to the reading units 224 by the transport amount of the document D which is transported with a single rotation of the transport roller 222.

In step S510, the control unit 240 ends the reading of the image the reading units 224, and accelerates the transport motor 229 in step S511. In step S512, the control unit 240 determines whether or not the feed motor 228 is being driven.

In a case in which the feed motor 228 is being driven (step S512: YES), in step S513, the control unit 240 accelerates the feed motor 228 and transitions the process to step S502. In a case in which the feed motor 228 is stopped (step S512: NO), in step S514, the control unit 240 stops the transport motor 229 and ends the image reading process routine.

Next, regarding the operations of the image reading apparatus 211 which is configured as described above, description will be given of the operations in a case in which a job of reading an image is input in a state in which two documents D are placed on the placement portion 216 based on the timing chart of FIG. 20. The placement detection unit 231, the feed detection unit 232, and the transport detection unit 233 output a detection signal S11 in a case in which the document D is detected, and output a non-detection signal S12 in a case in which the document D is not detected.

Figure 20:
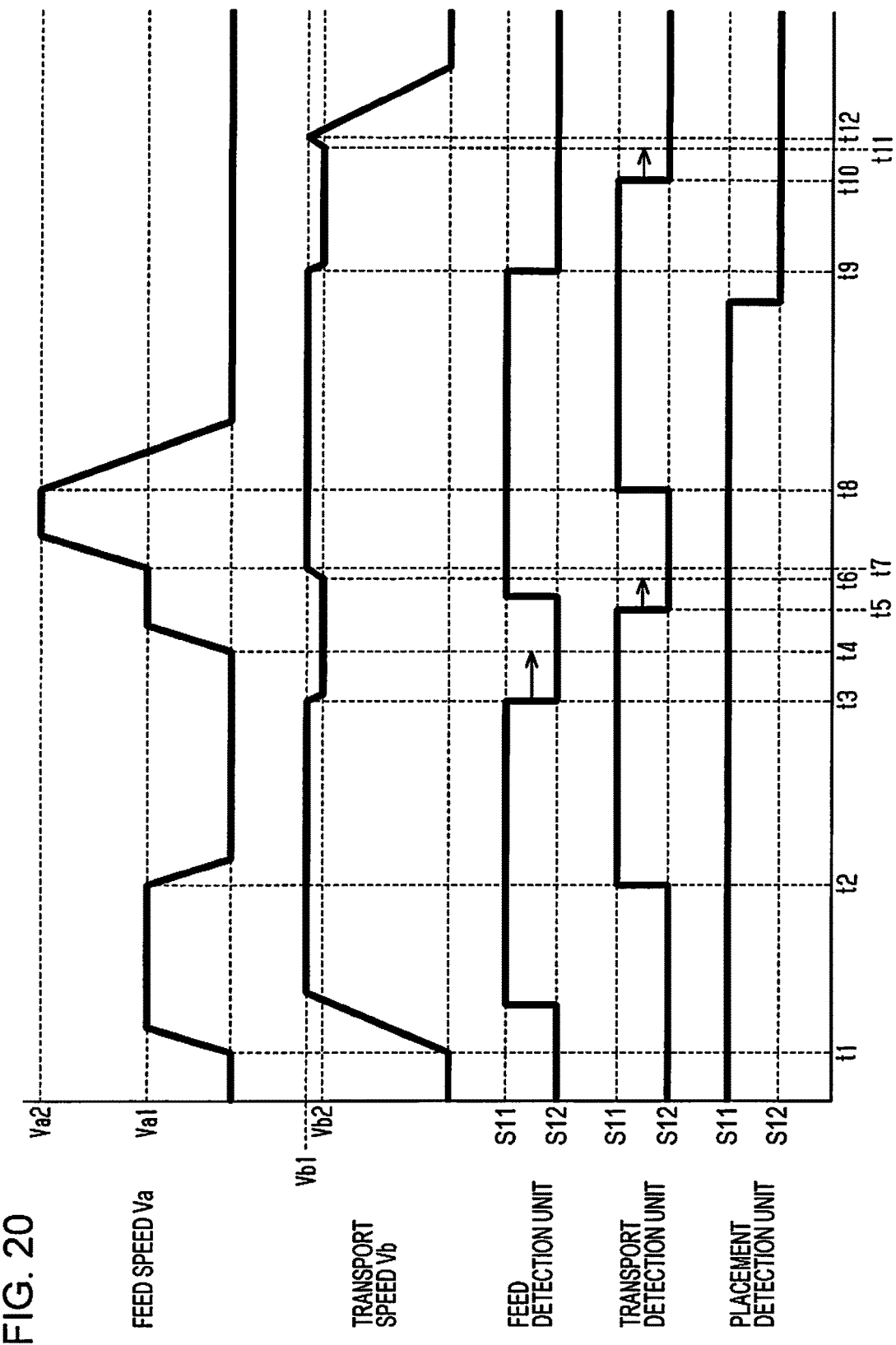
FIG. 20 is a timing chart illustrating a feed speed and a transport speed.

As illustrated in FIG. 20, the control unit 240 drives the feed motor 228 and the transport motor 229 at a first timing t1. The feed unit 218 feeds the document D at a first feed speed Va1, and the transport unit 221 transports the document D at a first transport speed Vb1.

At a second timing t2, when the transport detection unit 233 detects the leading end of the document D, the control unit 240 stops the feed motor 228 and sets the feed speed Va to zero. Since the transport motor 229 is being driven at this time, the transport roller 222 transports the document D at the first transport speed Vb1, and the feed roller 219 rotates to follow the document D which is transported by the transport roller 222. Meanwhile, the frictional force application portion 220 rotates backward and continues to apply a frictional force to the document D. The reading units 224 read an image of the document D at the timing at which the document D passes.

When the document D which is transported by the transport roller 222 passes the pinching position P1, the frictional force which is applied to the document D by the frictional force application portion 220 stops acting on the document D, and the feed detection unit 232 detects the rear end of the document D.

At a third timing t3, when the feed detection unit 232 detects the rear end of the document D, the control unit 240 decelerates the transport motor 229. Specifically, the control unit 240 decelerates the transport speed Vb at which the transport roller 222 transports the document D from the first transport speed Vb1 to the second transport speed Vb2. The second transport speed Vb2 is a speed at which it is possible to nullify changed in the frictional force which occur before and after the rear end of the document D passes the pinching position P1. Therefore, the speed at which the document D passes the reading units 224 in a case in which the document D to which the frictional force application portion 220 applies a frictional force is transported at the first transport speed Vb1 is approximately the same as the speed at which the document D passes the reading units 224 in a case in which the document D on which the frictional force of the frictional force application portion 220 does not act is transported at the second transport speed Vb2.

Since the transport roller 222 also causes the discharge roller 225 and the frictional force application portion 220 to rotate, the discharge roller 225 decelerates the discharge speed at which the document D is discharged and the rotational speed of the frictional force application portion 220 in accordance with the transport speed Vb. In other words, the control unit 240 decelerates the discharge speed in accordance with decelerating the transport speed Vb.

At the third timing t3, since the placement detection unit 231 detects the next document D, at a fourth timing t4 which is reached once a predetermined time is elapsed from the third timing t3, the control unit 240 drives the feed motor 228. The predetermined time is a time which is set according to the type of the image reading apparatus 211 and the type of the document D, and is set to a time (for example, one second) of a degree at which the document D which is previously fed does not overlap with the document D which is subsequently fed.

At a fifth timing t5, when the transport detection unit 233 detects the rear end of the document D, the control unit 240 waits until the rear end of the document D passes the reading units 224 and accelerates the transport speed Vb and the feed speed Va. Specifically, the control unit 240 accelerates the transport motor 229 at a sixth timing t6 at which the number of rotations which is detected by the rotation detection unit 234 exceeds the predetermined number of times after the transport detection unit 233 detects the rear end of the document D and the rear end of the document D passes the reading units 224. In other words, the transport speed Vb is accelerated from the second transport speed Vb2 to the first transport speed Vb1.

At a seventh timing t7, when the transport speed Vb reaches the first transport speed Vb1, the control unit 240 accelerates the feed motor 228 and accelerates the feed speed Va from the first feed speed Va1 to the second feed speed Va2.

At an eighth timing t8, when the transport detection unit 233 detects the leading end of the document D, the control unit 240 stops the feed motor 228 and sets the feed speed Va to zero.

At a ninth timing t9, when the feed detection unit 232 detects the rear end of the document D, the control unit 240 decelerates the transport motor 229 and decelerates the transport speed Vb from the first transport speed Vb1 to the second transport speed Vb2. Since the placement detection unit 231 does not detect the document D at this time, the control unit 240 does not drive the feed motor 228.

At a tenth timing t10, when the transport detection unit 233 detects the rear end of the document D, the control unit 240 waits until the rear end of the document D passes the reading unit 224, and accelerates the transport motor 229 at an eleventh timing t11. At a twelfth timing t12, when the transport speed Vb is accelerated to the first transport speed Vb1 and the document D is discharged to the discharge portion 227, the control unit 240 stops the transport motor 229 and sets the transport speed Vb to zero.

According to the embodiment described above, it is possible to obtain the following effects.

(1) Since the control unit 240 decelerates the transport speed Vb when the feed detection unit 232 detects the rear end of the document D, changes in the speed at which the document D passes the reading units 224 are reduced. Therefore, it is possible to reduce changes in the length of the image which is read by the reading units 224.

(2) For example, when the previous document D is transported at the slow transport speed Vb and the subsequent document D is transported at the fast transport speed Vb, the subsequent document D may catch up to the previous document D. Addressing this point, since the transport speed Vb is increased once the document D passes the reading units 224, it is possible to improve throughput while reducing the influence on the image which is read by the reading units 224.

(3) It is possible to accurately acquire the position of the document D in the transport path 217 based on the detection results of the transport detection unit 233 and the rotation detection unit 234. Therefore, it is possible to reduce the risk of the transport speed Vb being modified before the document D passes the reading units 224.

(4) Since the discharge speed is decelerated in accordance with decelerating the transport speed Vb, it is possible to reduce the speed difference between the transport speed Vb and the discharge speed. Therefore, it is possible to favorably perform the transferring of the document D from the transport roller 222 to the discharge roller 225 and the transporting of the document D.

(5) When the transport detection unit 233 detects the rear end of the document D which is previously fed, the control unit 240 accelerates the feed speed Va. Therefore, it is possible to reduce the speed difference between the feed speed Va and the transport speed Vb. Therefore, it is possible to smoothly transfer the document D which is subsequently fed from the feed unit 218 to the transport roller 222.

(6) For example, when the feed roller 219 starts rotating at a fast speed, the feed roller 219 may slip on the document D and be unable to feed the document D. Addressing this point, since the control unit 240 accelerates the feed speed Va after the feeding is started, it is possible to reduce the risk that the document D cannot be fed.

Furthermore, the embodiment described above can also be modified as described below.

In the embodiment which is described above, the placement detection unit 231, the feed detection unit 232, the transport detection unit 233, and the rotation detection unit 234 may be arbitrary detection units such as those which use contact and those which do not. For example, the feed detection unit 232 may be a contact sensor which includes a lever. For example, the transport detection unit 233 may be an optical sensor. The feed detection unit 232 and the transport detection unit 233 may be image sensors which detect the document D using image processing, or ultrasonic wave sensors which detect the document D according to the degree of attenuation of an ultrasonic wave.

In the embodiment which is described above, the first transport speed Vb1 may be the same speed as the first feed speed Va1.

In the embodiment which is described above, the control unit 240 may not accelerate the feed speed Va even if the transport detection unit 233 detects the rear end of the document D. In other words, the control unit 240 may not accelerate the feed speed Va at the seventh timing t7 indicated in FIG. 20. The control unit 240 may accelerate the feed speed Va at the fifth timing t5 at which the transport detection unit 233 detects the rear end of the document D, or at the sixth timing t6 at which the rear end of the document D passes the reading units 224.

In the embodiment which is described above, a configuration may be adopted in which the discharge roller 225 and the discharge driven roller 226 are not provided.

In the embodiment which is described above, the discharge speed may be fixed regardless of the transport speed Vb. In other words, the pressure with which the discharge roller 225 and the discharge driven roller 226 pinch the document D is set to be weak in comparison with the pressure with which the transport roller 222 and the transport follower roller 223 pinch the document D, for example, and in a case in which the transport speed Vb is decelerated, the discharge roller 225 may be allowed to slip on the document D.

In the embodiment which is described above, a configuration may be adopted in which at least one of the transport detection unit 233 and the rotation detection unit 234 is not provided. For example, once a predetermined time is elapsed from when the transport detection unit 233 detects the rear end of the document D, the control unit 240 may determine that the rear end of the document D is past the reading units 224.

In the embodiment which is described above, the control unit 240 may not accelerate the transport speed Vb even if the rear end of the document D passes the reading units 224. In other words, the control unit 240 may not accelerate the transport speed Vb at the sixth timing t6 and the eleventh timing t11. In a case in which the next document D is fed, the transport speed Vb may be accelerated between the sixth timing t6 and the eighth timing t8. At the eleventh timing t11 at which the rear end of the last document D passes the reading units 224, the transport motor 229 may be stopped in this state.

In the embodiment which is described above, the frictional force application portion 220 may be a separation pad which pinches the documents D together with the feed roller 219 to separate the documents D.

In the embodiment which is described above, the image reading apparatus 211 is not limited to a sheet feeding type, and may be a flatbed type image reading apparatus which is provided with an automatic document feeding apparatus (an auto sheet feeder) which automatically feeds the documents D. The image reading apparatus 211 may be applied to a multifunctional device which is configured to be integral with the printing apparatus, a FAX which is provided with a communication function, or the like.

The entire disclosure of Japanese Patent Application No. 2016-127606, filed Jun. 28, 2016, No. 2016-127607, filed Jun. 28, 2016, and No. 2016-127608, filed Jun. 28, 2016 are expressly incorporated by reference herein.

What is claimed is:

1. An image reading apparatus comprising:
a feed unit which includes a feed roller which feeds a medium from a placement portion on which the medium is placed toward a transport path, and a frictional force application portion which applies a frictional force to an opposite side from a transport direction between the frictional force application portion and the medium which is fed by the feed roller;
a feed detection unit which detects the medium which is fed by the feed unit; and
a reading unit which reads an image of the medium which is transported along the transport path from an upstream side toward a downstream side in the transport direction,
wherein at least a portion of the feed detection unit and a detection region of the feed detection unit are provided at a position between a pinching position and an intersecting position in the transport direction, the pinching position being a position at which the feed roller and the frictional force application portion pinch the medium, the intersecting position being a position at which a common tangential line [Ng] which is in contact with a side surface of the feed roller and a side surface of the frictional force application portion on the downstream side of the pinching position in the transport direction intersects the transport path, at least the portion of the feed detection unit and the detection region of the feed detection unit being provided at a position which is a different position from the feed roller in a width direction which intersects the transport direction.

2. The image reading apparatus according to claim 1, further comprising:
a transport roller which transports the medium along the transport direction,
wherein the feed detection unit is provided at a position closer to the upstream side in the transport direction than the transport roller.

3. The image reading apparatus according to claim 1, further comprising:
a multi-feed detection unit which detects multi-feed of the medium,
wherein the feed detection unit is provided at a position closer to the upstream side in the transport direction than the multi-feed detection unit.

4. The image reading apparatus according to claim 3, wherein the multi-feed detection unit is provided on one side and the feed detection unit is provided on the other side in the width direction to interpose a center of the transport path.

5. The image reading apparatus according to claim 1, further comprising:
a housing portion which houses the feed roller,
wherein the feed detection unit is provided in a different position from the housing portion.

6. The image reading apparatus according to claim 1, wherein a drive force transmission unit which transmits a drive force of a drive source to the feed roller is provided on one side and the feed detection unit is provided on the other side in the width direction to interpose a center of the transport path.

7. The image reading apparatus according to claim 1, wherein the feed detection unit is provided at a position which is greater than or equal to 35 mm and less than or equal to 40 mm from a center of the transport path in the width direction.

8. An image reading apparatus comprising:
a feed unit which feeds a medium from a placement portion on which the medium is placed toward a transport path;
a feed detection unit which detects the medium which is fed by the feed unit;
a transport detection unit which detects the medium which is transported along the transport path from an upstream side toward a downstream side in a transport direction;
a reading unit which reads an image of the medium which is transported; and
a control unit which controls driving of the feed unit,
wherein the feed detection unit and the transport detection unit output a detection signal in which the medium is detected and a non-detection signal in which the medium is not detected,
wherein in a case in which a discharge number which is a number of times the feed detection unit outputs the non-detection signal is less than or equal to one time in a duration from when the feed detection unit outputs the detection signal until when the transport detection unit outputs the detection signal, the control unit drives the feed unit when the feed detection unit outputs the non-detection signal after the transport detection unit outputs the detection signal, and in a case in which the discharge number is greater than or equal to two times, the control unit drives the feed unit when the transport detection unit outputs the non-detection signal.

9. The image reading apparatus according to claim 8, wherein the feed detection unit is provided in a different position from a center of the transport path in a width direction which intersects the transport direction.

10. The image reading apparatus according to claim 8, wherein the feed detection unit includes a light emitting unit which emits light and a light receiving unit which receives the light which is emitted from the light emitting unit, and
wherein the transport detection unit includes a contact portion which comes into contact with the medium.

11. The image reading apparatus according to claim 8, wherein the feed detection unit and the transport detection unit are provided in different positions in a width direction which intersects the transport direction.

12. The image reading apparatus according to claim 8, wherein the feed detection unit is provided at a position which is greater than or equal to 35 mm and less than or equal to 40 mm from a center of the transport path in a width direction which intersects the transport direction.

13. An image reading apparatus comprising:
a feed unit which includes a feed roller which feeds a medium from a placement portion on which the medium is placed toward a transport path, and a frictional force application portion which applies a frictional force to an opposite side from a feed direction between the frictional force application portion and the medium which is fed by the feed roller;
a feed detection unit which is provided closer to a downstream side in the feed direction than the frictional force application portion and which detects the medium which is fed by the feed unit;
a transport roller which transports the medium which is fed by the feed unit from an upstream side to a downstream side in a transport direction;
a reading unit which reads an image of the medium which is transported by the transport roller; and
a control unit which controls driving of the transport roller,
wherein the control unit decelerates a transport speed at which the transport roller transports the medium when the feed detection unit detects a rear end of the medium.

14. The image reading apparatus according to claim 13, wherein the control unit accelerates the transport speed once the rear end of the medium passes the reading unit.

15. The image reading apparatus according to claim 13, further comprising:
a transport detection unit which is provided at a position between the feed detection unit and the reading unit in the transport direction, and which detects the medium which is transported; and
a rotation detection unit which detects a number of rotations of the transport roller,
wherein the control unit accelerates the transport speed once the number of rotations which is detected by the rotation detection unit exceeds a predetermined number of times after the transport detection unit detects the rear end of the medium.

16. The image reading apparatus according to claim 13, further comprising:
a discharge roller which discharges the medium which is transported by the transport roller, wherein the control unit decelerates a discharge speed at which the discharge roller discharges the medium in accordance with decelerating the transport speed.

17. The image reading apparatus according to claim 13, wherein the transport speed is faster than a feed speed at which the feed unit feeds the medium, and wherein the control unit accelerates the feed speed when a transport detection unit which detects the medium which is transported detects the rear end of the medium.

* * * * *